US008496585B2

(12) United States Patent
Lu

(10) Patent No.: US 8,496,585 B2
(45) Date of Patent: Jul. 30, 2013

(54) HIGH FRAME RATE IMAGING SYSTEM

(75) Inventor: Jian-Yu Lu, Sylvania, OH (US)

(73) Assignee: The University of Toledo, Toledo, OH (US)

( * ) Notice: Subject to any disclaimer, the term of this patent is extended or adjusted under 35 U.S.C. 154(b) by 972 days.

(21) Appl. No.: 12/162,001

(22) PCT Filed: Jan. 26, 2007

(86) PCT No.: PCT/US2007/002162
§ 371 (c)(1),
(2), (4) Date: Jul. 24, 2008

(87) PCT Pub. No.: WO2007/089580
PCT Pub. Date: Aug. 9, 2007

(65) Prior Publication Data
US 2009/0036772 A1     Feb. 5, 2009

Related U.S. Application Data

(60) Provisional application No. 60/762,326, filed on Jan. 26, 2006, provisional application No. 60/848,273, filed on Sep. 29, 2006.

(51) Int. Cl.
*A61B 8/00* (2006.01)
(52) U.S. Cl.
USPC .......................................... 600/437; 600/438
(58) Field of Classification Search
None
See application file for complete search history.

(56) References Cited

U.S. PATENT DOCUMENTS

| 5,492,121 | A | 2/1996 | Lu |
| 5,696,737 | A | 12/1997 | Hossack et al. |
| 5,720,708 | A | 2/1998 | Lu et al. |
| 5,799,649 | A | 9/1998 | Prince |
| 6,053,869 | A * | 4/2000 | Kawagishi et al. ........... 600/443 |
| 6,350,241 | B1 * | 2/2002 | Lifshitz ......................... 600/454 |
| 6,463,318 | B2 | 10/2002 | Prince |
| 6,497,666 | B1 | 12/2002 | Phillips et al. |
| 6,504,892 | B1 | 1/2003 | Ning |

(Continued)

FOREIGN PATENT DOCUMENTS

WO     2007/089580     8/2007

OTHER PUBLICATIONS

Lu, Jian-Yu, 2D and 3D High Frame Rate Imaging with Limited Diffraction Beams, IEEE Transactions on Ultrasonics, Ferroelectrics, and Frequency Control, vol. 44, No. 4, Jul. 1997, pp. 839-856.

(Continued)

*Primary Examiner* — Long V. Le
*Assistant Examiner* — Bo J Peng
(74) *Attorney, Agent, or Firm* — MacMillan, Sobanski & Todd, LLC

(57) ABSTRACT

A system for producing an image using an imaging system includes a) transmitting at least one signal of energy toward an object to be imaged by using two transmitters having the same output amplitude but of an opposite sign, or by using one transmitter to perform the task; b) exciting at least one transducer element to produce limited-diffraction array beams or their square-wave approximations with two levels of quantitations for both sine and cosine functions, c) weighting the received signals spatially with limited-diffraction array beams, their square-wave approximations, or spatial Fourier transform, and d) digitizing and then transferring received signals through high-speed optical fibers to a system for image reconstructions.

25 Claims, 11 Drawing Sheets

U.S. PATENT DOCUMENTS

| | | | |
|---|---|---|---|
| 6,685,641 | B2 | 2/2004 | Liu |
| 6,816,556 | B2 | 11/2004 | Kim |
| 6,867,720 | B1 | 3/2005 | Freeman et al. |
| 7,173,551 | B2 | 2/2007 | Vrazel et al. |
| 2002/0167693 | A1* | 11/2002 | Vrazel et al. .................. 359/109 |
| 2003/0233044 | A1* | 12/2003 | Brock-Fisher ................ 600/437 |
| 2004/0024313 | A1* | 2/2004 | Moriya et al. ................. 600/437 |
| 2004/0034304 | A1* | 2/2004 | Sumi .............................. 600/439 |
| 2004/0077946 | A1* | 4/2004 | Ohmiya ......................... 600/437 |
| 2004/0158154 | A1* | 8/2004 | Hanafy et al. ................. 600/446 |
| 2005/0065450 | A1* | 3/2005 | Stuebe et al. ................. 600/547 |
| 2009/0066727 | A1 | 3/2009 | Lu et al. |

OTHER PUBLICATIONS

Lu, Jian-Yu, Transmit-Receive Dynamic Focusing with Limited Diffraction Beams, 1997 IEEE Ultrasonics Symposium, pp. 1543-1546.

Lu, Jian-Yu, Experimental Study of High Frame Rate Imaging with Limited Diffraction Beams, IEEE Transactions on Ultrasonics, Ferroelectrics, and Frequency Control, vol. 45, No. 1, Jan. 1998, pp. 84-97.

Lu, Jian-Yu, Nonlinear Processing for High Frame Rate Imaging, American Institute of Ultrasound in Medicine, 1999 (43rd) Annual Convention, Mar. 14-17, San Antonio, TX USA (submitted: Sep. 1, 1998), one page.

Lu, Jian-Yu et al., Increasing field of view of high frame rate ultrasonic imaging, Acoustical Society of America, 139th Meeting, May 30-Jun. 3, 2000, Atlanta, GA USA (submitted: Jan. 10, 2000), one page.

Lang, Roberto et al., Three-Dimensional Cardiac Ultrasound, Radiology Management Nov./Dec. 2002, pp. 1-5, vol. 24.

Cheng, Jiqi et al., Fourier based imaging method with steered plane waves and limited-diffraction array beams, 2005 IEEE International Ultrasonics Symposium, Conference centre De Doelen, Rotterdam, The Netherlands, Sep. 19-21, 2005, one page.

Wang, Zhaohui et al., Contrast and resolution study of Fourier-based method, 2005 IEEE International Ultrasonics Symposium, Conference centre De Doelen, Rotterdam, The Netherlands, Sep. 19-21, 2005, two pages.

International Search Report/Opinion (Mar. 23, 2007), PCT, International application No. PCT/US06/33751 filed Aug. 29, 2006.

International Search Report/Opinion (Dec. 19, 2007), PCT, International application No. PCT/US07/02162 filed Jan. 26, 2007.

Ramadan, M., Analog Signals Transmission over Optical Fiber Systems, 1985, IEEE MTT-S Digest, pp. 303-306.

IEEE Transactions on Ultrasonics, Ferroelectrics, and Frequency Control, vol. 50, No. 9, Sep. 2003, http://www.ieee-uffc.org/tr/, p. 1078.

Lu, Jian-Yu et al., Development of a Linear Power Amplifier for High Frame Rate Imaging System, 2004, IEEE International Ultrasonics, Ferroelectrics, and Frequency Control Joint 50th Anniversary Conference, pp. 1413-1416.

Wang, Jing et al., A Study of Motion Artifacts of of Fourier-Based Image Construction, 2005, IEEE Ultrasonics Symposium, pp. 1439-1442.

Fox, Paul et al., Connection Between X Waves, Fourier-Based Series and Optimal Modelling Aperturefor Circular Symmetric Arrays2005, IEEE Ultrasonics Symposium, pp. 1644-1647.

Cheng, Jiqi et al., Fourier Based Imaging Method with Steered Plane Waves and Limited-Diffraction Array Beams, 2005, IEEE Ultrasonics Symposium, pp. 1976-1979.

Lu, Jian-Yu et al., Field computation for Two-dimensional Array Transducers with Limited Diffraction Array Beams, 2005, Ultrasonic Imaging, 27: 237-255.

PCT International Preliminary Report on Patentability dated Jul. 29, 2008, PCT/US2007/002162, Jan. 26, 2007.

* cited by examiner

|  | Depth (mm) | Unfocused Beams (HFR) | | | Focused Beams (D&S) | | |
| --- | --- | --- | --- | --- | --- | --- | --- |
|  |  | MI | TI (TIS) | AO (mW/cm$^2$) | MI | TI (TIS) | AO (mW/cm$^2$) |
| V2 2.5MHz Transducer (19.2 mm) | 30 | 1.41 | 3.64 | 374.20 | 2.90 | 3.64 | 2770.77 |
|  | 40 | 1.47 | 3.64 | 427.56 | 2.54 | 3.64 | 2482.99 |
|  | 60 | 1.16 | 3.64 | 412.32 | 1.68 | 3.64 | 1340.63 |
|  | 70 | 0.99 | 3.64 | 299.38 | 1.32 | 3.64 | 843.84 |
|  | 90 | 0.71 | 3.64 | 143.29 | 0.87 | 3.64 | 319.20 |
| Custom 3.5MHz Transducer (40.96 mm) | 30 | 0.49 | 1.07 | 55.71 | 1.85 | 1.07 | 1166.97 |
|  | 40 | 0.46 | 1.07 | 52.89 | 1.64 | 1.07 | 1103.38 |
|  | 60 | 0.36 | 1.07 | 38.91 | 1.11 | 1.07 | 530.28 |
|  | 80 | 0.25 | 1.07 | 16.94 | 0.71 | 1.07 | 198.33 |
|  | 100 | 0.16 | 1.07 | 7.44 | 0.45 | 1.07 | 88.76 | ents:

HIGH FRAME RATE IMAGING SYSTEM

CROSS REFERENCE TO RELATED APPLICATIONS AND SPONSORED RESEARCH

This application claims the benefit of PCT/US07/002,162 filed Jan. 26, 2007, which claims priority to U.S. Provisional Application Nos. 60/762,326 filed Jan. 26, 2006, and 60/848,273, filed Sep. 29, 2006, the disclosures of which are expressly incorporated herein by reference.

This invention was made partly with government support under Grant No. R01 HL60301 awarded by the National Institute of Health. The government has certain rights in this invention.

FIELD OF THE INVENTION

A novel high-frame rate (HFR) imaging system that uses a square-wave aperture weighting imaging method to produce multi-dimensional images.

BACKGROUND OF THE INVENTION

One of the limited-diffraction beams, the Bessel beam, was first studied theoretically by Stratton [1] and then experimentally by Durnin et al [2]-[3]. In 1991, new families of limited-diffraction beams such as X waves were discovered [4]-[8]. X waves are multiple-frequency waves and have the same phase and group velocity. Theoretically, limited-diffraction beams can propagate to an infinite distance without spreading. In practice, when these beams are produced with finite aperture and energy, they have a large depth of field. Because of this property, limited-diffraction beams have potential applications in medical imaging [9]-[11], tissue identification [12], nondestructive evaluation (NDE) of materials [13], Doppler blood flow measurement [14]-[15], fast computation of fields of 2D array transducers [16], optical communications [17], and other optics [18] and physics related areas [19]. Recently, X waves have been studied in nonlinear optics [20] and reported in the "Search and Discovery" column of [21].

Based on the studies of limited-diffraction beams [22]-[23], a two-dimensional (2D) and three-dimensional (3D) high frame rate (HFR) imaging method was developed in 1997 [24]-[26] with its importance reported in [27].

Recently, the present inventor herein discovered a system for extended high frame rate imaging using limited diffraction beams, which is disclosed in the co-pending PCT patent application PST/US06/033751 filed Aug. 29, 2006, which is expressly incorporated herein by reference, and which was later the subject of several publications. [28]-[32].

The extended HFR imaging method increases image resolution and field of view [37] as compared to the conventional delay-and-sum (D&S) methods with a fixed transmission focus [38] and dynamically focused reception. As more and more limited-diffraction array beams of different parameters or plane waves steered at different angles are transmitted (lower image frame rate), the image quality increases. The trade-off between the image quality and frame rate is useful for imaging of organs that do not move fast, such as the liver and kidney.

Although the extended high-frame rate imaging method has many advantages, an imaging system to implement this method still has many challenges, such as: i) the imaging system is complicated and requires a large amount of power to operate and thus is difficult to be integrated to a transducer probe that a physician can hold to move freely around a patient; ii) the amount of data acquired by an array transducer, especially, an array of a large number of elements such as two-dimensional arrays, is huge and thus would be difficult to be transferred to a separate imaging system through fewer cables; iii) there would be too many cables to send transmit signals to individual transducer elements to produce ultrasound for an array with a large number elements; and iv) the image reconstruction process is complicated and requires many circuits.

Therefore, there is a compelling and crucial need in the art to simplify imaging systems for fast multi-dimensional ultrasound imaging that is made and operated at low cost.

SUMMARY OF THE INVENTION

In one aspect, there is provided a system for producing a high frame rate, high resolution and high contrast image The system generally can include: a) transmitting a group of signals of energy toward one or more objects to be imaged, the signals being weighted spatially on one or more transmitting apertures i) by square waves, or ii) by limited-diffraction beams; b) weighting or Fourier transforming receive signals spatially on one or more receiving apertures; c) reconstructing a two- or three-dimensional image data set from i) the transmitted signals, and, ii) the receive signals; and, d) reconstructing the image from the image data set of step c.

In another aspect, there is provided a system for producing a high frame rate, high resolution and high contrast velocity vector image of one or more objects where at least a part of one or more objects is moving. The system can generally include: a) transmitting two or more groups of signals of energy toward the one or more objects, the signals being weighted spatially on one or more transmitting apertures i) by square waves, or by limited diffraction beams; b) weighting or Fourier transforming receive signals spatially on one or more receiving apertures; c) reconstructing two- or three-dimensional image data sets from the groups of: i) the transmitted signals, and, ii) the receive signals; and; d) using the image data sets to reconstruct: i) a first set of flow velocity component images in a first direction, and ii) a second set of flow velocity component images in a second direction that is different from the first direction; and, e) reconstructing one or more velocity vectors image from the first and second sets of velocity component images.

In yet another aspect, there is provided a system for producing a high frame rate, high resolution and high contrast image of one or more objects. The system can be an apparatus that generally includes: 1) one or more devices configured to: a) transmit a group of signals of energy toward the one or more objects, the signals being weighted spatially on one or more transmitting apertures: i) by square-waves, or ii) by limited diffraction beams; and b) receive, and weight or Fourier transform receive signals spatially on one or more receiving apertures; 2) one or more devices configured to reconstruct a two- or three-dimensional image data set from the transmitted signals and the receive signals; and/or 3) one or more devices configured to reconstruct the image from the image data set.

In another aspect, there is provided a system for producing a high frame rate, high resolution and high contrast image comprising an array transducer probe operatively linked via an optical link to an imaging system. The array transducer probe can include one or more devices configured to transmit a group of signals of energy toward the one or more objects, the signals being weighted spatially on one or more transmitting apertures: i) by square-waves, or ii) by limited diffraction beams.

In still another aspect, there is provided a high frame rate imaging system comprising a high-speed optical link between an array transducer probe and an image reconstruction system. The optical link can include one or more of the following, alone or in combination: one or more multi-bit analog-to-digital converters or one or more delta-sigma digitizers configured to produce bit streams; one or more bit steam combiners configured to funnel multi-channel data into higher-speed bit steams with fewer channels; one or more light-emission-diodes (LED) or any suitable light-emission devices configured to convert electrical bit streams to optical signals; one or more optical spectral combiners configured to combine multi-channel optical signals; one or more optical fiber interface and fibers; and, one or more light detectors and circuits configured to recover original electrical receive echo data produced by the array transducer probe. The image reconstruction system can be configured to reconstruct multidimensional images through square-wave aperture weightings or spatial fast Fourier Transform FFT circuits. The system can further include a device to amplify signals from the array transducer probe.

In yet another aspect, there is provided a high frame rate imaging system that can include one or more of the following, alone or in combination: a) a device capable of recording radio frequency (RF) data from one or more transducer elements for at least one heart cycle synchronized to an electrocardiogram (ECG)-signal at a desired frame rate determined by ultrasound propagation speeds and system timing overhead; b) at least one independent linear power transmitter and its associated fast transmit/receive (T/R) switch for each transducer element; and, c) a device capable of storing the acquired RF data and transferring the stored data to a computer for one or more of signal processing and image reconstruction.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT(S)

I. High-Frame Rate Imaging System and Square-Wave Aperture Weightings in Transmissions I.A. Theoretical Preliminaries To understand the method of limited-diffraction array beam imaging with square-wave aperture weightings, it is helpful to summarize briefly the extended HFR imaging method and relate it to the X wave theory [4]-[8] for completeness. From the theory, it is shown that the relationship that the limited-diffraction array beam aperture weightings [24]-[26] on echo signals are identical to the 2D Fourier transform of the signals on the same transducer aperture can be generalized to an arbitrary transmit beam. The theory also makes it clear that with the square-wave aperture weightings, the transmission scheme of an imager could be simplified from that of the traditional D&S method [38], i.e., in principle, only one or two transmitters are needed to implement a 3D ultrasound imaging system. In addition, the square-wave aperture-weighting concept can also be extended to reception beam forming, potentially simplifying the high-speed digital circuits for image reconstructions.

I.A.1. Generalization of High Frame Rate Imaging Theory

Figure 2:
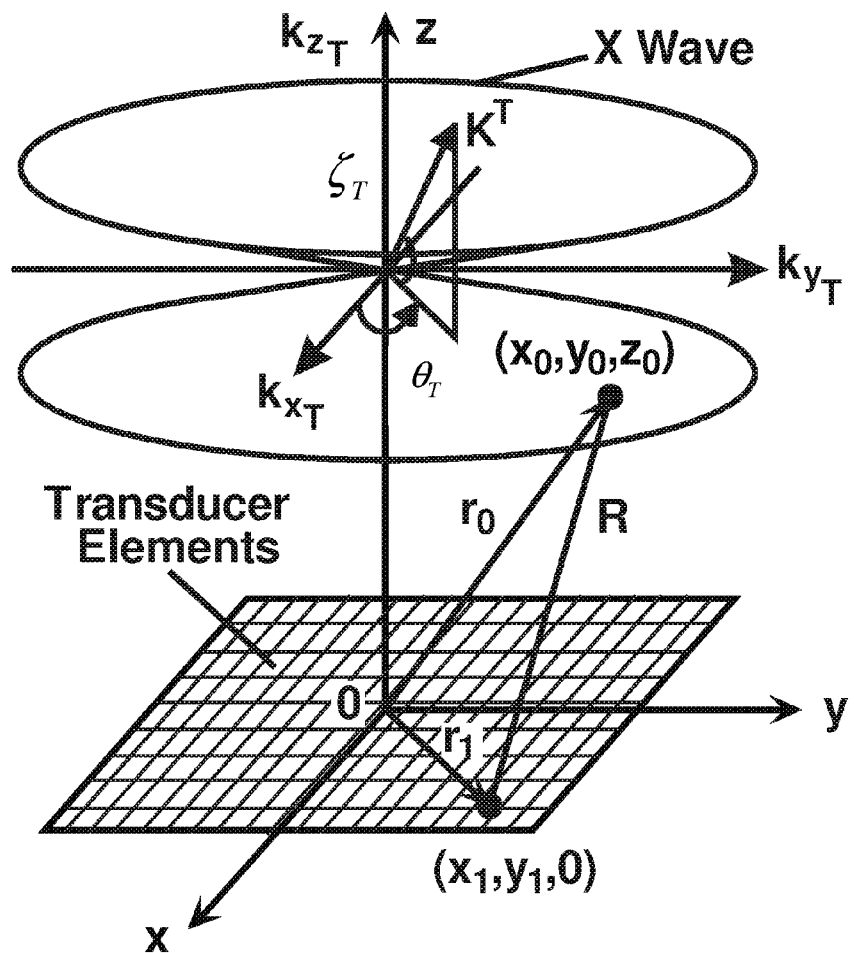
FIG. 2 is the coordinates of transducer, Fourier space, and an X wave in space.

An N-dimensional isotropic/homogeneous wave equation is given by:

$$\left[\sum_{j=1}^{N} \frac{\partial^2}{\partial x_j^2} - \frac{1}{c^2}\frac{\partial^2}{\partial t^2}\right]\Phi(\vec{r}, t) = 0 \qquad (1)$$

where, $x_j$, ($j=1, 2, \ldots, N$) represents rectangular coordinates in an N-dimensional space, $N \geq 1$ is an integer, $\Phi(\vec{r},t)$ is a scalar function (sound pressure, velocity potential, or Hertz potential in electromagnetics) of spatial variables, $\vec{r}=(x_1, x_2, \ldots x_N)$, and time, t. c is the speed of sound in a medium (or the speed of light in vacuum). An X wave solution to (1) is given by (assuming N=3, $x_1=x$, $x_2=y$, and $x_3=z$) [4]-[8]:

$$\Phi_{X_n}(\vec{r}_0, t) = \Phi_{X_n}(r_0, \phi_0, z_0 - c_1 t) \qquad (2)$$
$$= e^{in\phi_0}\int_0^\infty B(k)J_n(kr_0\sin\zeta_T)e^{-k[a_0 - i\cos\zeta_T(z_0 - c_1 t)]}\,dk,$$
$$(n = 0, 1, 2, \ldots)$$

where the subscript "$X_n$" represents an nth-order X wave, n is an integer, $\vec{r}_0=(x_0, y_0, z_0)=(r_0, \phi_0, z_0)$ is a spatial point in the rectangular or cylindrical coordinates ($x_0=r_0 \cos\phi_0$ and $y_0=r_0 \sin\phi_0$) (see FIG. 2), $r_0$ is the radial distance, $\phi_0$ is the polar angle, $z_0$ is the axial distance, $c_1=c/\cos\zeta_T$ is both the phase and group velocity of the wave, $0 \leq \zeta_T < \pi/2$ is the Axicon angle [47] of X waves (see FIG. 2), $J_n(\cdot)$ is the nth-order Bessel function of the first kind, B(k) is any well-behaved function that could represent the transfer function of a practical acoustic transducer (or electromagnetic antenna), $a_0$ is a constant that determines the fall-off speed of the high-frequency components of X waves, and $k=\omega/c$ is the wave number, where $\omega=2\pi f$ is the angular frequency, and f is the temporal frequency. In the following, we assume that $\vec{r}_1=(x_1, y_1, 0)$ is a point at the surface of the transducer (FIG. 2).

Summing the X waves in (2) over the index, n, with the weight, $i^n e^{-in\theta_T}$, broadband limited-diffraction array beams [14], or pulsed steered plane waves (a plane wave is a special case of limited-diffraction beams) are obtained, which are also limited-diffraction solutions to (1) (see Eq. (3) of [24]):

$$\Phi_{Array}^T(\vec{r}_0, t) = \sum_{n=-\infty}^{\infty} i^n e^{-in\theta_T}\Phi_{X_n}(r_0, \phi_0, z_0 - c_1 t) \qquad (3)$$

$$= \int_0^\infty B(k)\left[\sum_{n=-\infty}^{\infty} i^n J_n(kr_0\sin\zeta_T)e^{in(\phi_0-\theta_T)}\right]e^{-k[a_0 - i\cos\zeta_T(z_0 - c_1 t)]}\,dk$$

where $0 \leq \theta_T < 2\pi$ is a free parameter representing an azimuthal angle (see FIG. 2), the superscript "T" in $\Phi_{Array}^T(\vec{r}_0,t)$ means "transmission", and the subscript "Array" represents "array beams". Because of the following equality [48], $$\sum_{n=-\infty}^{\infty} i^n J_n(kr_0\sin\zeta_T)e^{in(\phi_0-\theta_T)} = e^{i(kr_0\sin\zeta_T)\cos(\phi_0-\theta_T)} \qquad (4)$$

and the relationship (see FIG. 2), $$\begin{cases} k_{x_T} = k\sin\zeta_T\cos\theta_T = k_{1_T}\cos\theta_T \\ k_{y_T} = k\sin\zeta_T\sin\theta_T = k_{1_T}\sin\theta_T \\ k_{z_T} = k\cos\zeta_T = \sqrt{k^2 - k_{1_T}^2} \geq 0;\ \text{where}\ k_{1_T} = \sqrt{k_{x_T}^2 + k_{y_T}^2} = k\sin\zeta_T \end{cases} \qquad (5)$$

where $k_{x_T}$ and $k_{y_T}$ are projections of the transmission wave vector along the $x_1$ and $y_1$ axes, respectively, the array beams can be written as the following Fourier transform pair in terms of time, (see Eqs. (5) and (6) of [24]):

$$\begin{cases} \Phi_{Array}^T(\vec{r}_0, t) = \frac{1}{2\pi}\int_{-\infty}^{\infty} A(k)H(k)e^{ik_{x_T}x_0 + ik_{y_T}y_0 + ik_{z_T}z_0}\,e^{-i\omega t}\,dk \\ \tilde{\Phi}_{Array}^T(\vec{r}_0, \omega) = \frac{A(k)H(k)}{c}e^{ik_{x_T}x_0 + ik_{y_T}y_0 + ik_{z_T}z_0} \end{cases} \qquad (6)$$

where $A(k)=2\pi B(k)e^{-ka_0}$ is a transmitting transfer function of the transducer elements that includes both the electrical response of the driving circuits and the electro-acoustical coupling characteristics [49] and $H(\omega/c)=\{1, \omega \geq 0;\ 0, \omega < 0\}$ is the Heaviside step function [50]. The spectrum of the array beam in (6) is an expression of a monochromatic (single angular frequency $\omega$) plane wave steered at the direction along the transmission wave vector, $\vec{K}^T=(k_{x_T}, k_{y_T}, k_{z_T})$.

Similar to (6), the response of a transducer weighted with a broadband limited-diffraction array beam [14], [33] or pulsed steered plane wave for a point source (or scatterer) located at $\vec{r}_0$ is given by the following Fourier transform pair due to the reciprocal principle:

$$\begin{cases} \Phi_{Array}^R(\vec{r}_0, t) = \frac{1}{2\pi}\int_{-\infty}^{\infty} T(k)H(k)e^{ik_x x_0 + ik_y y_0 + ik_z z_0}\,e^{-i\omega t}\,dk \\ \tilde{\Phi}_{Array}^R(\vec{r}_0, \omega) = \frac{T(k)H(k)}{c}e^{ik_x x_0 + ik_y y_0 + ik_z z_0} \end{cases} \qquad (7)$$

where the superscript "R" means "reception", T(k) is the transfer function of the transducer in reception, $\tilde{\Phi}_{Array}^R(\vec{r}_0,\omega)$ is an expression of a monochromatic plane wave response steered at the direction along the reception wave vector, $\vec{K}^R=(k_x, k_y, k_z)$, where $k_x$ and $k_y$ are projections of the reception wave vector along the $x_1$ and $y_1$ axes, respectively, and $k_z=\sqrt{k^2 - k_x^2 - k_y^2} \geq 0$.

If the same array transducer is used as both transmitter and receiver, from (6) and (7), the received signal for the wave scattered from all point scatterers inside the volume, V, of an object function, $f(\vec{r}_0)$ (representing the scattering strength of a scatterer at point $\vec{r}_0$), is given by a linear superposition of individual scattering sources over V. This signal can be represented by the following Fourier transform pair in terms of time (see Eqs. (13) and (15) of [24]):

$$\begin{cases} R_{k_x+k_{x_T},k_y+k_{y_T},k_z+k_{z_T}}(t) = \int_V f(\vec{r}_0)[\Phi^T_{Array}(\vec{r}_0;t) * \Phi^R_{Array}(\vec{r}_0;t)]\,d\vec{r}_0 \\ = \frac{1}{2\pi}\int_{-\infty}^{\infty} \frac{A(k)T(k)H(k)}{c}\left[\int_V f(\vec{r}_0)e^{i(k_x+k_{x_T})x_0+i(k_y+k_{y_T})y_0+i(k_z+k_{z_T})z_0}\,d\vec{r}_0\right]e^{-i\omega t}\,dk \\ = \frac{1}{2\pi}\int_{-\infty}^{\infty} \frac{A(k)T(k)H(k)}{c}F(k_x+k_{x_T},k_y+k_{y_T},k_z+k_{z_T})e^{-i\omega t}\,dk \\ \tilde{R}_{k'_x,k'_y,k'_z}(\omega) = \frac{A(k)T(k)H(k)}{c^2}F(k'_x,k'_y,k'_z) \end{cases} \quad (8)$$

where $$\begin{cases} k'_x = k_x + k_{x_T} \\ k'_y = k_y + k_{y_T} \\ k'_z = k_z + k_{z_T} = \sqrt{k^2 - k_x^2 - k_y^2} + \sqrt{k^2 - k_{x_T}^2 - k_{y_T}^2} \geq 0 \end{cases} \quad (9)$$

and "*" represents the convolution with respect to time. This uses the fact that the spectrum of the convolution of two functions is equal to the product of the spectra of the functions, and assumes that the imaging system is linear and multiple scattering can be ignored (First Born or weak scattering approximation [51]-[52]). The 3D spatial Fourier transform in (8) is defined the same as that in Eq. (14) of [24]. The relationship between the one-dimensional (1D) temporal Fourier transform (spectrum) of the received echo signal that is weighted by a limited-diffraction array beam [14], and the 3D spatial Fourier transform of the object function is the key for image reconstructions (see Eqs. (16), (18), and (22) of [24]).

I.A.2. Limited-Diffraction Array Beam Weighting and Spatial Fourier Transform of Echo Signals Using (6) and (7), it is clear that (8) can be rewritten as follows:

$$\tilde{R}_{k'_x,k'_y,k'_z}(\omega) = \int_V f(\vec{r}_0)\tilde{\Phi}^T_{Array}(\vec{r}_0,\omega)\tilde{\Phi}^R_{Array}(\vec{r}_0,\omega)\,d\vec{r}_0 = \quad (10)$$

$$\int_V f(\vec{r}_0)\tilde{\Phi}^T_{Array}(\vec{r}_0,\omega)\mathfrak{I}_{x_1,y_1}\{\mathfrak{I}^{-1}_{k_x,k_y}\{\tilde{\Phi}^R_{Array}(\vec{r}_0,\omega)\}\}\,d\vec{r}_0 =$$

$$\mathfrak{I}_{x_1,y_1}\left\{\int_V [f(\vec{r}_0)\tilde{\Phi}^T_{Array}(\vec{r}_0,\omega)]\right.$$

$$\left.\left(-\frac{T(k)H(k)}{2\pi c}\frac{\partial}{\partial z_0}\left(\frac{e^{ik\sqrt{(x_1-x_0)^2+(y_1-y_0)^2+z_0^2}}}{\sqrt{(x_1-x_0)^2+(y_1-y_0)^2+z_0^2}}\right)\right)d\vec{r}_0\right\}$$

where the last equal sign in (10) is due to the shift theorem of Fourier transform and the following equality (see Eq. (13) of [53]):

$$e^{ik_z z_0} = -\frac{1}{2\pi}\mathfrak{I}_{x_1,y_1}\left\{\frac{\partial}{\partial z_0}\left(\frac{e^{ik\sqrt{x_1^2+y_1^2+z_0^2}}}{\sqrt{x_1^2+y_1^2+z_0^2}}\right)\right\} \quad (11)$$

where $\mathfrak{I}_{x_1,y_1}$ represents a 2D Fourier transform in terms of both $x_1$ and $y_1$ at the transducer surface and $\mathfrak{I}^{-1}_{k_x,k_y}$ is an inverse 2D Fourier transform in terms of both $k_x$ and $k_y$. Because the term, $$-\frac{1}{2\pi}\frac{\partial}{\partial z_0}\left(\frac{e^{ik\sqrt{(x_1-x_0)^2+(y_1-y_0)^2+z_0^2}}}{\sqrt{(x_1-x_0)^2+(y_1-y_0)^2+z_0^2}}\right) \quad (12)$$

in (10) is the kernel of the Rayleigh-Sommerfeld diffraction formula (see Eq. (3-36) of [54], and [53]), it represents the field produced at $\vec{r}_1=(x_1, y_1, 0)$ due to a point source (scatterer) located at $\vec{r}_0=(x_0, y_0, z_0)$. It is clear that if the transmission array beam, $\tilde{\Phi}^T_{Array}(\vec{r}_0,\omega)$, is replaced with an arbitrary beam, (10) is still valid. The effects of the transmission beam and the object function, $f(\vec{r}_0)$, in (10) are to modulate the phase and amplitude of point sources at $\vec{r}_0$. This proves that the limited-diffraction array beam aperture weightings [24]-[26], [34] of echo signals (represented by $\tilde{\Phi}^R_{Array}(\vec{r}_0,\omega)$) are identical to the 2D spatial Fourier transform of the signals over the same transducer aperture, $\vec{r}_1$, even for an arbitrary transmission beam. Because an arbitrary transmission beam can always be expanded in terms of an array beam [14], (10) or (8) can be used to reconstruct images for more complicated transmission schemes [54].

I.A.3. Limited-Diffraction Array Beam Imaging

The relationship between the Fourier transform of an object function and that of received echo signals ((8) and (9)) is very general and flexible in terms of image reconstructions. They include many methods developed previously. For example: (i) HFR imaging (plane wave transmission without steering, i.e., $k_{x_T}=k_{y_T}=0$ in (9)) [24]-[25]; (ii) two-way dynamic focusing (both $k_x=k_{x_T}$ and $k_y=k_{y_T}$ in (9) for multiple limited-diffraction array beam transmissions and receptions) [24], [26]; (iii) multiple steered plane waves with the same steering angles in each plane-wave transmission and reception ($k_x = k_{x_T} = k \sin \xi_T \cos \theta_T$ and $k_y = k_{y_T} = k \sin \xi_T \sin \theta_T$ in (9), where $\xi_T$ and $\theta_T$ are fixed in each transmission, and are the Axicon angle and the azimuthal angle of X waves, respectively) [36]; (iv) steered plane waves (fixing $\xi_T$ and $\theta_T$ in (5) and (9) in each transmission but varying $k_x$ and $k_y$ in image reconstructions, i.e., $k_{x_T} = k \sin \xi_T \cos \theta_T$ and $k_{y_T} = k \sin \xi_T \sin \theta_T$); and (v) limited-diffraction array beam imaging, where $k_{x_T}$ and $k_{y_T}$ in (9) are fixed in each transmission but $k_x$ and $k_y$ are varied in image reconstructions. In the last method, the following sets of four limited-diffraction array beams [14], for each pair of $k_{x_T}$ and $k_{y_T}$ are transmitted for 3D imaging [28]-[31]:

$$\begin{cases} \Phi^T_{Array(1)}(\vec{r}_0, t) = \cos(k_{x_T} x_0)\cos(k_{y_T} y_0) G(z_0, t; k_{x_T}, k_{y_T}) \\ \Phi^T_{Array(2)}(\vec{r}_0, t) = \cos(k_{x_T} x_0)\sin(k_{y_T} y_0) G(z_0, t; k_{x_T}, k_{y_T}) \\ \Phi^T_{Array(3)}(\vec{r}_0, t) = \sin(k_{x_T} x_0)\cos(k_{y_T} y_0) G(z_0, t; k_{x_T}, k_{y_T}) \\ \Phi^T_{Array(4)}(\vec{r}_0, t) = \sin(k_{x_T} x_0)\sin(k_{y_T} y_0) G(z_0, t; k_{x_T}, k_{y_T}) \end{cases} \quad (13)$$

where $$G(z_0, t; k_{x_T}, k_{y_T}) = \frac{1}{2\pi} \int_{-\infty}^{\infty} A(k) H(k) e^{i k_z T z_0} e^{-i\omega t} dk = \mathfrak{I}_\omega^{-1}\{A(k)H(k)e^{ik_{z_T} z_0}/c\} \quad (14)$$

and where $\mathfrak{I}_\omega^{-1}$ represents an inverse Fourier transform in terms of $\omega$.

For every set of transmissions, one obtains four areas of coverage in the spatial Fourier domain of $f(\vec{r}_0)$, denoted as $\tilde{R}^{(1)} = \tilde{R}_{k_x', k_y', k_z'}^{(1)}(\omega)$, $\tilde{R}^{(2)} = \tilde{R}_{k_x', k_y', k_z'}^{(2)}(\omega)$, $\tilde{R}^{(3)} = \tilde{R}_{k_x', k_y', k_z'}^{(3)}(\omega)$, and $\tilde{R}^{(4)} = \tilde{R}_{k_x', k_y', k_z'}^{(4)}(\omega)$, respectively, from combinations of the four echo signals (see (8)):

$$\begin{cases} F_{BL}(k_x + k_{x_T}, k_y + k_{y_T}, k_z') = c^2 H(k)(\tilde{R}^{(1)} + i\tilde{R}^{(2)} + i\tilde{R}^{(3)} - \tilde{R}^{(4)}) \\ F_{BL}(k_x + k_{x_T}, k_y - k_{y_T}, k_z') = c^2 H(k)(\tilde{R}^{(1)} - i\tilde{R}^{(2)} + i\tilde{R}^{(3)} + \tilde{R}^{(4)}) \\ F_{BL}(k_x - k_{x_T}, k_y + k_{y_T}, k_z') = c^2 H(k)(\tilde{R}^{(1)} + i\tilde{R}^{(2)} - i\tilde{R}^{(3)} + \tilde{R}^{(4)}) \\ F_{BL}(k_x - k_{x_T}, k_y - k_{y_T}, k_z') = c^2 H(k)(\tilde{R}^{(1)} - i\tilde{R}^{(2)} - i\tilde{R}^{(3)} - \tilde{R}^{(4)}) \end{cases} \quad (15)$$

From both (15) and (9), high-quality 3D images that have an equivalent of dynamic focusing in both transmission and reception of the traditional D&S method [38] can be reconstructed. Varying the free parameters, $k_{x_T}$ and $k_{y_T}$, from one set of transmissions to another, one obtains partially overlapped coverage of the spatial Fourier domain. Superposing the resulting partially reconstructed images in space or in their spatial Fourier domain from different transmissions, one obtains the final image. The superposition in the spatial domain can be done either coherently (increasing image resolution and contrast) or incoherently (reducing speckle). In the frequency domain, the superposition can only be done coherently, which in theory, is equivalent to the superposition in the spatial domain. The superposition will also increase the field of view of the final image for transducers of a finite aperture.

In the case of 2D imaging, (13) and (15) can be simplified by setting $k_y = k_{y_T} = 0$ (similar to Eq. (34) of [24]):

$$\begin{cases} \Phi^T_{Array(1)}(x_0, z_0, t) = \cos(k_{x_T} x_0) G_1(z_0, t; k_{x_T}) \\ \Phi^T_{Array(2)}(x_0, z_0, t) = \sin(k_{x_T} x_0) G_1(z_0, t; k_{x_T}) \\ F_{BL}(k_x + k_{x_T}, k_z') = c^2 H(k)(\tilde{R}_{k_x', k_z'}^{(1)}(\omega) + i\tilde{R}_{k_x', k_z'}^{(2)}(\omega)) \\ F_{BL}(k_x - k_{x_T}, k_z') = c^2 H(k)(\tilde{R}_{k_x', k_z'}^{(1)}(\omega) - i\tilde{R}_{k_x', k_z'}^{(2)}(\omega)) \end{cases} \quad (16)$$

where $G_1(z_0, t; k_{x_T}) = G(z_0, t; k_{x_T}, k_{y_T})$ with $k_{y_T} = 0$.

I.A.4. Square-Wave Aperture Weightings

Traditional imaging method such as D&S [38] requires a phase delay for each element of an array transducer to focus or steer a beam. The phase delay makes it difficult to share transmitters among transducer elements. As a result, a large number of transmitters are needed, especially, for an array transducer that has many elements such as a 2D array. Although limited-diffraction array beam imaging method in (13) and (16) may reduce the number of transmitters, it would still need a large number of transmitters to realize the exact sine and cosine aperture weightings.

The need of a large number of transmitters may cause problems. For example, modern transmitters are linear RF power amplifiers to accommodate the need of applications such as nonlinear imaging [41] and coded excitations [42]. To maintain a good linearity over a broad bandwidth at a high output voltage, the transmitters may consume a large power and thus they must be physically large to dissipate heat and avoid short circuit. In addition, to produce an exact sine and cosine weightings with an array transducer, each transducer element may need a complicated switching network to connect among a large number of transmitters between transmissions.

To reduce the number of transmitters, we develop the limited-diffraction array beam imaging with square-wave aperture weightings, in which the sine and cosine aperture weightings in (13) and (16) are approximated, respectively, with the following square-wave weighting functions:

$$w_s(x) = \begin{cases} 1, & \sin(x) \geq 0 \\ -1, & \sin(x) < 0 \end{cases} \quad (17)$$

and $$w_c(x) = \begin{cases} 1, & \cos(x) \geq 0 \\ -1, & \cos(x) < 0 \end{cases} \quad (18)$$

If $k_{x_T}$, $k_{y_T}$, or both $k_{x_T}$ and $k_{y_T}$ in (13) and (16) are zero, the corresponding sine functions are set to zero, i.e., these beams are not transmitted. With such an approximation, a 3D imaging system may be developed with only two transmitters: one has an output voltage of a fixed amplitude, and the other has an inverted output from the first. Each transducer element is then connected to either one of the transmitters through an electronic switch that is controlled by a digital logic, depending on the sign of the sine and cosine functions at the position of the element. Combined with the computation efficiency of the FFT algorithm used in the HFR imaging method [24]-[26], simplified HFR and high-quality 3D imaging systems could be constructed.

The square-wave aperture weightings can also be implemented with a single transmitter to further reduce the number of transmitters (removing the inverting transmitter and setting the negative weighting amplitude to zero). In this case, transducer elements are switched on or off to the single transmitter before each transmission, which may simplify the switching circuits. However, the direct current (DC) offset in the weighting functions needs to be compensated during the image reconstruction, which may require additional transmissions with a DC weighting that may reduce the image frame rate and complicate the signal processing although the additional transmissions may be used to enhance the SNR for the center strip of the image. In addition, because about half of the transducer elements are not activated in each transmission (except for $k_{x_T}=k_{y_T}=0$), the SNR of echo signals may be reduced.

It is worth noting that, because of the reciprocal relationship in (8), where $\Phi_{Array}^{R}(\vec{r}_0,t)$ and $\Phi_{Array}^{T}(\vec{r}_0,t)$ are exchangeable, the square-wave aperture weightings can also be applied to the reception beam forming to approximate the limited-diffraction array beam aperture weightings of echo signals [24]-[26], [34]. This may simplify the hardware needed to produce $R_{k_x+k_{x_T},k_y+k_{y_T},k_z+k_{z_T}}(t)$ in (8) for all $k_x$ and $k_y$, given a pair of $k_{x_T}$ and $k_{y_T}$ in a transmission. For example, analog summation and subtraction amplifiers could be used to produce all the required spatial frequency components at $k_x$ and $k_y$ in realtime to replace some of high-speed FFT [55] circuits.

Although the square-wave aperture weighting method is general for both 2D and 3D imaging, for simplicity, in this document only 2D image will be reconstructed based on (16). In addition, the spatial Fourier transform of echo signals over transducer apertures in (10) will be used to speed up image reconstructions.

I.B. Development of HFR Imaging System

I.B.1. Imaging System Development

To experimentally study and further understand the high frame rate (HFR) imaging methods, a general-purpose HFR imaging system was designed and constructed [39]-[40]. The successful construction of the system has helped to develop the method of limited-diffraction array beam imaging with square-wave aperture weightings in Section II by studying the method experimentally.

The HFR imaging system was designed with the following basic requirements: (i) It is capable of recording RF data from each transducer element for at least one heart cycle synchronized to an electrocardiogram (ECG) signal at the maximum frame rate determined by the ultrasound propagation speeds in soft tissues and the system timing overhead. (ii) The system has an independent linear power transmitter (amplifier) and an associated fast transmit/receive (T/R) switch for each transducer element. (iii) RF data acquired are stored in the system and then transferred to a personal computer (PC) via a standard high-speed link such as a universal serial bus (USB) 2.0 (up to 480 Mb/s) for image reconstruction and the system is controlled by the same PC. (iv) The system is flexible for various image reconstruction algorithms.

From the basic requirements, both the transmission and reception circuits were designed to have 128 independent channels for an array transducer of 128 elements. The bandwidth of both the transmitter and receiver is about 10 MHz. The sampling frequency is 40 MHz and the quantization resolution is 12 bits for both analog-to-digital (A/D) and digital-to-analog (D/A) converters that are used to digitize echo signals and produce arbitrary transmission waveforms, respectively. Each receiving channel has a time-gain-control (TGC) amplifier and has a 64 MB synchronous random access memory (SDRAM) (up to 512 MB/channel) in a DIMMM (dual in-line memory module) socket. The linear power amplifier in each channel is independent and is capable of driving a 75-Ohm resistive load at up to +/−44V peak voltage, producing an arbitrary waveform of a maximum length of 51.2 μs in each transmission and having an accuracy of 6.25 ns (160 MHz clock) in time delays. The system can be triggered by external sources such as an ECG machine, and it is able to trigger and synchronize external equipment. The system has a modular design with great redundancies built into the printed circuit boards (PCBs) so that each may be used independently without connecting to other PCBs. This will help to test new research ideas without redesigning the PCBs. To take advantage of the computing power of modern PCs and avoid obsoleteness, the system does not implement image reconstruction algorithms in hardware. The system can be viewed as the arms and legs of a PC, through which users control the system by setting parameters on a graphical user interface (GUI) developed with Microsoft Visual C++. The system is capable of semi real-time imaging using a loop command on the GUI. The speed of the loop mainly depends on that of image reconstructions of the PC.

The current design is based on field-programmable gate arrays (FPGAs). One advantage of the FPGA-based design is that the hardware functions of the system can be upgraded through software without redesigning the circuits. Because of the fast pace of the advancement of digital electronics in industry, the system design has been improved several times to take advantage of the latest technologies. The first in vivo image of a human heart was obtained with the system and a custom-made 128-element transducer of 0.32 mm pitch and 3.5 MHz center frequency (see Section III.B below). During the course of the development of the HFR imaging system, dozens of small subsystems have also been developed for fast prototyping. It is worth noting that, currently, many imaging systems are capable of obtaining RF signals from particular beam formers or from transducer elements [56]-[60]. However, these systems are developed with different design philosophies or are tailored for specific applications.

Figure 3:
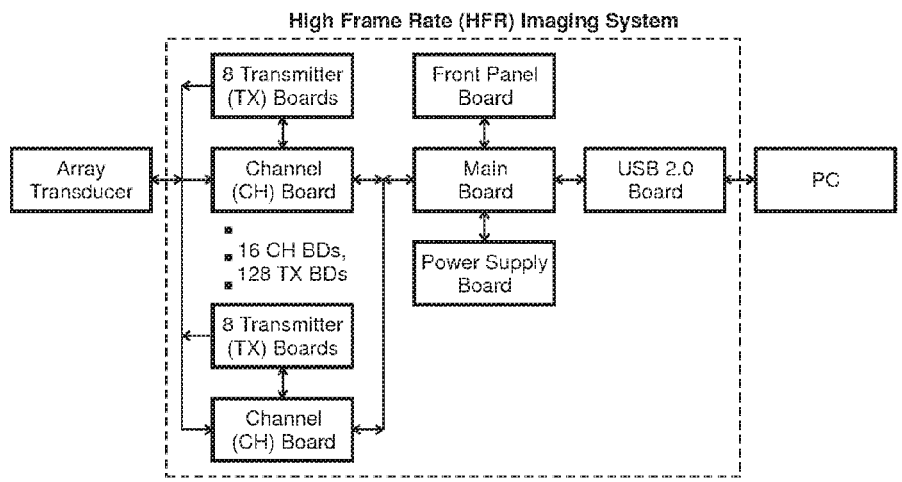
FIG. 3 is a block diagram of the high frame rate (HFR) imaging system.

FIG. 3 shows a block diagram of the HFR imaging system that is consisted of six types of PCBs. The dashed box indicates printed circuit boards (PCBs) and components housed inside the enclosure of the HFR imaging system. The system consists of 6 different boards: (i) Transmitter (TX) Board, (ii) Channel (CH) Board, (iii) Main Board, (iv) USB 2.0 Board, (v) Front Panel Board, and (vi) Power Supply Board. Each Channel Board contains 8 independent analog receiving channels and digital circuits that control 8 independent transmitters, respectively. There are 16 Channel Boards (128 channels) and 128 Transmitter Boards in total in the system. An array transducer is connected in front to send and receive ultrasound waves and a personal computer (PC) is, used to control the system and get radio-frequency (RF) data from each transducer element to reconstruct images.

In the embodiment shown, there are 16 Channel Boards, each of which contains 8 receiving channels, for a total of 128 channels. There is one Transmitter Board for each channel. Commercial array transducers of up to 128 elements can be connected to the imaging system through various pin converters. A PC is used to control the system and receive data for image reconstructions.

It should be understood, however, that other suitable configurations are within the contemplated scope of the present system described herein.

Surface-mount technology (SMT) is used to construct PCBs. Multiple layers are used to improve signal integrity (reduce the radio-frequency interference (RFI) and electromagnetic interference (EMI)) and to accommodate complicated routing requirements (there are about 5,000 components with 15,000 pads for each Channel Board). Traces on the boards are at least 6 mils (6/1000 inches) wide to reduce costs.

Figure 8:
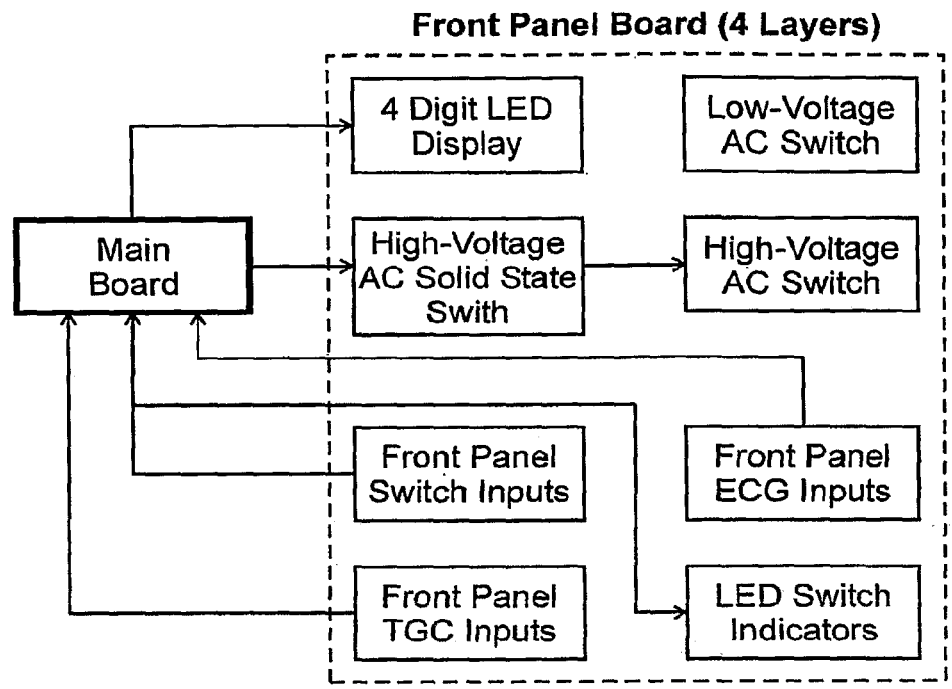
FIG. 8 shows a block diagram of the Front Panel Board shown in FIG. 3.
Figure 9:
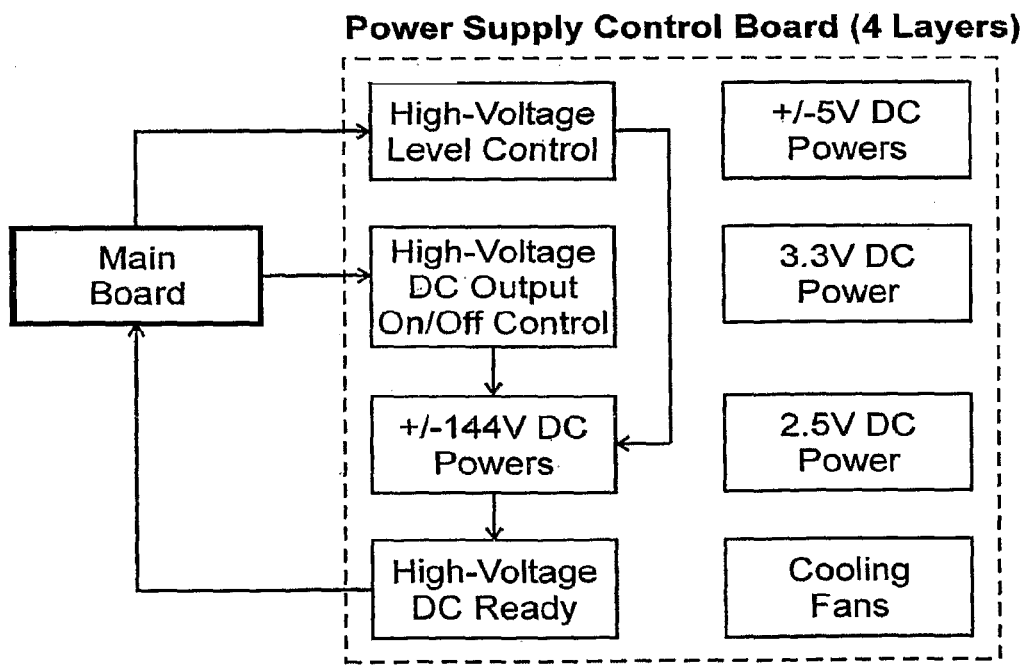
FIG. 9 shows a block diagram of the Power Supply Board shown in FIG. 3.
Figure 10:
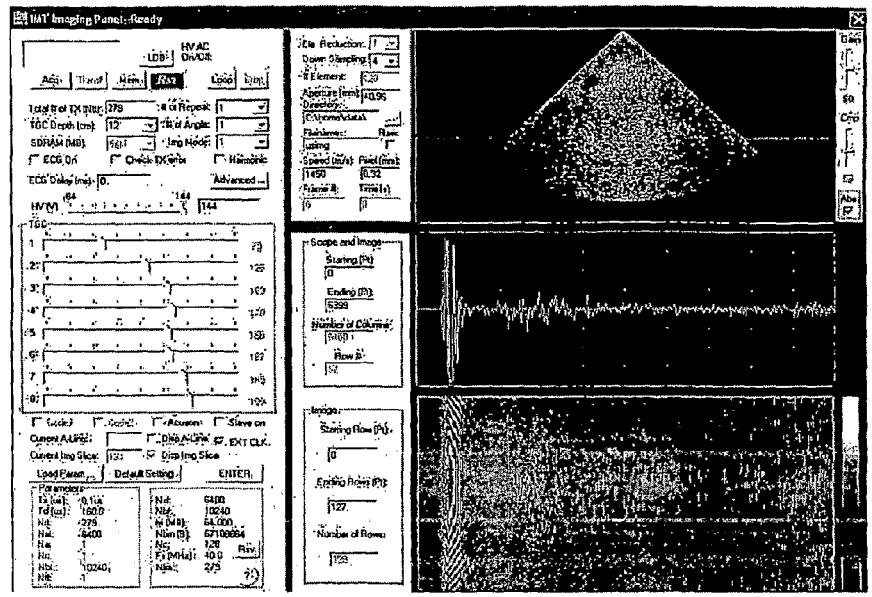
FIG. 10 shows a graphical user interface (GUI) written in Microsoft Visual C++ and run on the Microsoft Windows XP operating system to control the HFR imaging system.

Non-limiting examples of block diagrams of six types of PCBs are shown in FIG. 4-9, while the GUI used to control the system is shown in FIG. 10.

Figure 4:
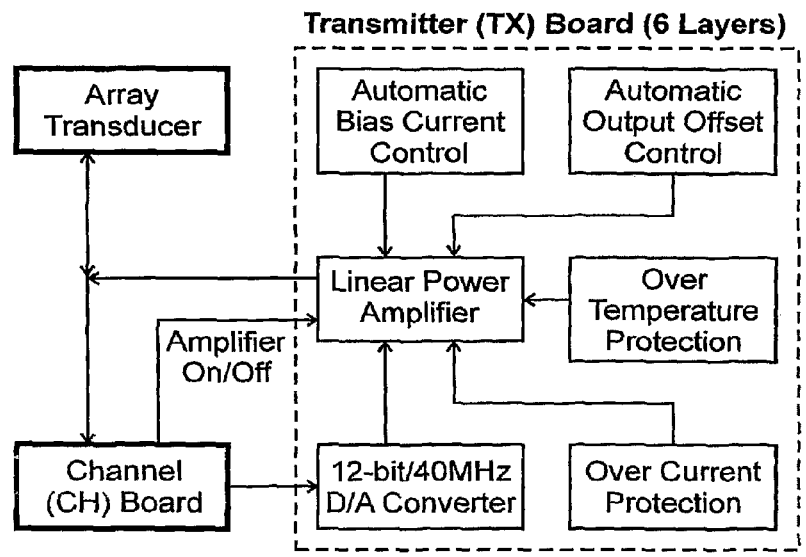
FIG. 4 shows a block diagram of a Transmitter Board shown in FIG. 3.

FIG. 4 shows a block diagram of a Transmitter Board shown in FIG. 3. The dashed box indicates circuit components on the board. The interaction of the board with other parts of the system is also shown. The linear amplifier is designed to produce broadband (0.05 MHz to 10 MHz) arbitrary waveforms (with a 40 MHz 12-bit D/A converter) of a maximum output up to +/−144V peak voltage at a 75-ohm resistive load. To reduce the static power consumption and nonlinear distortions, the bias current and the offset voltage of the transmitter are automatically controlled and adjusted i[39]. The amplifier is also protected from output shortage and equipped with an over temperature shutdown circuit.

Figure 5:
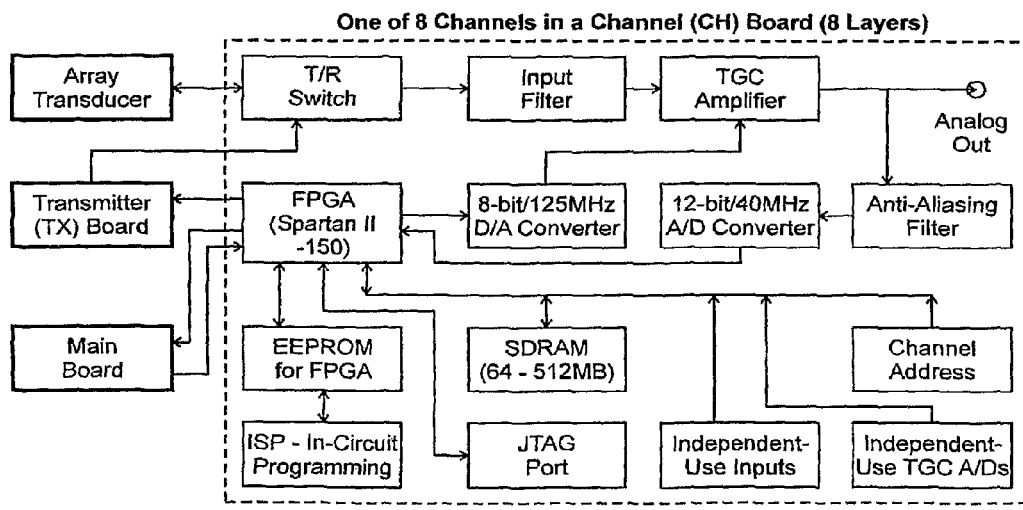
FIG. 5 shows a block diagram of one of the 8 channels on a Channel Board shown in FIG. 3.

FIG. 5 shows a block diagram of one of the 8 channels on a Channel Board shown in FIG. 3. The dashed box and its interaction with other parts of the system are similar to those of FIG. 4. The channel has a standard low-noise, high-gain (108 dB), and broadband (−6 dB bandwidth of about 0.25 MHz to 10 MHz) time-gain-control (TGC) analog front end with a 40 MHz, 12-bit A/D converter. Buffered analog output is available. The channel is controlled by an FPGA (Xilinx Spartan II-150). The FPGA is interfaced to 64-512 MB SDRAM and is capable of in-system programming (ISP). Data can be sent to and from the Main Board via cables. Each Channel Board can also be used independently without the Main Board, meaning it can be used as an 8-channel analog pulser/receiver with an 8-segment TGC control (via an 8-channel 2 MS/s A/D converter), pulse inversion for harmonic imaging, time delays for beam steering and focusing, preprogrammed transmission waveforms, and TGC depth selections. The EEPROM, ISP, and JTAG components are used for different ways of FPGA programming.

Figure 6:
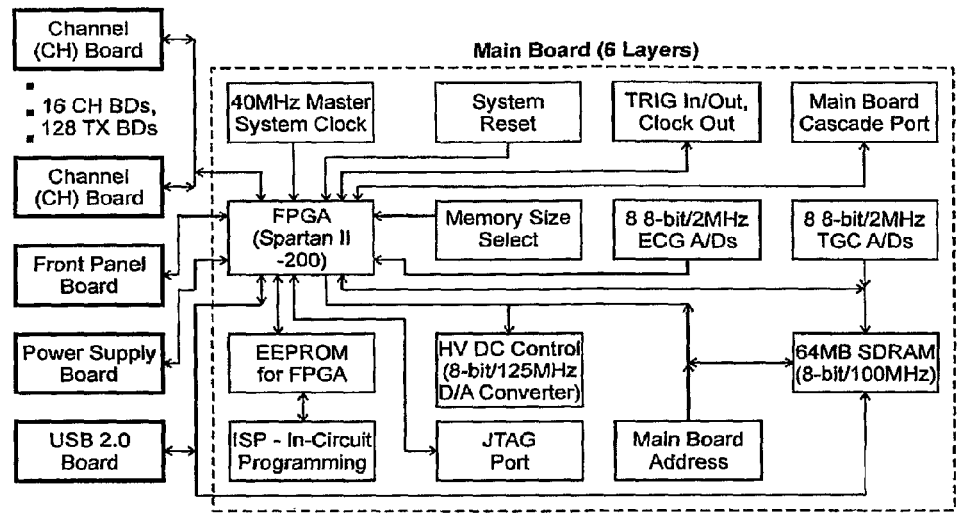
FIG. 6 shows a block diagram of the Main Board shown in FIG. 3.

FIG. 6 shows a block diagram of the Main Board shown in FIG. 3. The dashed box and its interaction with other parts of the system are similar to those of FIG. 4. The FPGA (Xilinx Spartan II-200) and its programming components have similar functions as those in FIG. 5. This board contains a 40 MHz master clock and interacts with most parts of the system. The Main board can be cascaded (using its address to distinguish between boards) with other Main Boards to increase the number of channels beyond 128. The board has a 64 MB SDRAM to hold configuration data sent from a PC. An 8-bit/125 MHz D/A converter can be used for multiple purposes in addition to trim up/down the high-voltages applied to the transmitters. Memory size selector indicates the size of installed memory in the Channel Boards (in one of the following sizes: 64, 128, 256, or 512 MB/channel). Two 8-channel 2 MHz A/D converters are used to digitize TGC levels and the ECG signal, among other uses. The system can be controlled and synchronized by external equipments, or vice versa, through the TRIG IN/OUT and CLOCK IN/OUT interface. Multiple system reset mechanisms are available through front panel, on board push button, and PC.

Figure 7:
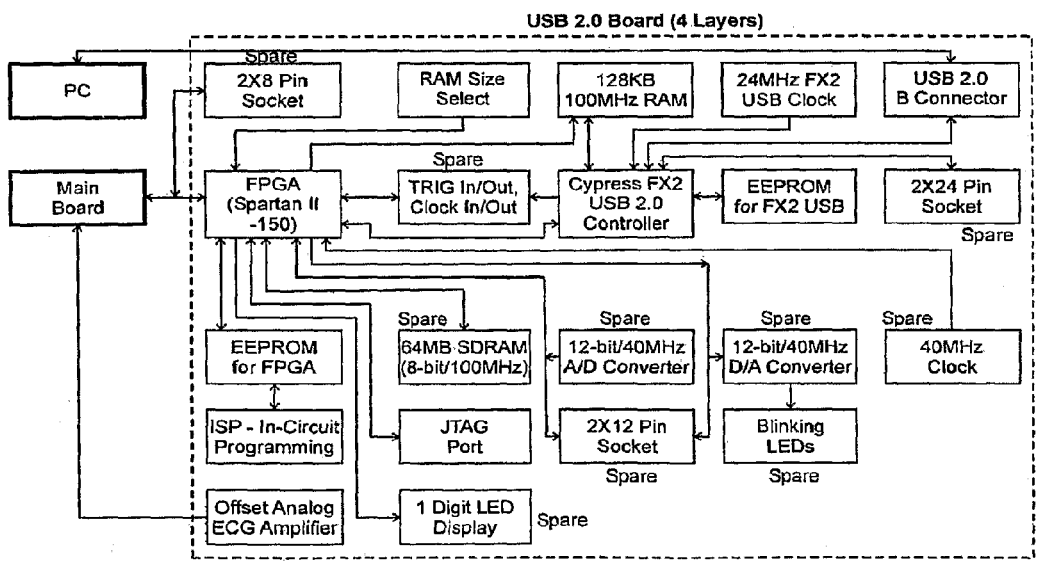
FIG. 7 shows a block diagram of the USB 2.0 Board shown in FIG. 3.

FIG. 7 shows a block diagram of the USB 2.0 Board shown in FIG. 3. The dashed box and its interaction with other parts of the system are similar to those of FIG. 4. The FPGA (Xilinx Spartan II-150) and its programming components have similar functions as those in FIG. 5. The main function of the board is to provide a USB 2.0 (up to 480 Mbits/s) interface between the imaging system and a PC. The function is implemented with a Cypress FX2 chip that contains an 8051 microcontroller running with 128 KB RAM. A 512 Kbit EEPROM is used to store the program (firmware) of 8051 microcontroller. FX2 is running with a 24 MHz clock that is different from the 40 MHz system master clock. The board contains spare components (see the word "spare" near the components) so that it can be easily used as an independent high-speed (40 MHz) and high-resolution (12-bit) A/D and D/A converters with an on-board 64 MB memory and with the ability to synchronize or be synchronized with an external equipment through its TRIG IN/OUT and CLOCK IN/OUT circuits. Spare header sockets make it easier to connect the board with external circuits. The offset analog ECG amplifier is used for the ECG A/D on the Main board. The one digit light emitting diode (LED) can be used for the diagnosis of the FPGA or 8051 microcontroller program and for board status display.

FIG. 8 shows a block diagram of the Front Panel Board shown in FIG. 3. The dashed box and its interaction with other parts of the system are similar to those of FIG. 4. The board interacts with the front panel switches and buttons to accept commands and display the status of the HFR imaging system using a 4-digit LED panel. The front panel inputs include 8 TGC setting potentiometers, ECG on/off, ECG delay setting, system reset, system commands, system functions, low-voltage and high-voltage power on/off switches, and solid state on/off switch for high-voltage power that is controllable via a PC. Each switch or button is associated with an LED indicator.

FIG. 9 shows a block diagram of the Power Supply Board shown in FIG. 3. The dashed box and its interaction with other parts of the system are similar to those of FIG. 4. The board interacts with the Main Board to turn on/off DC outputs and adjust the DC output level of the +/−144V high-voltage power supplies via a PC. The board also detects whether the high-voltage. DC level has reached desired values so that the Main Board can start to issue data acquisition commands. In addition to the high-voltage power supplies, the system has several % low-voltage power supplies. (+/−5V, 3.3V, and 2.5V). Fans are installed to cool the system.

FIG. 10, shows the graphical user interface (GUI) written in Microsoft Visual C++ and run on the Microsoft Windows XP operating system to control the HFR imaging system. Parameters set on the GUI are sent to the system and echo data acquired are sent back to PC via the USB 2.0 link. The system works as if it were the arms and legs of the PC. The image shown was a thumbnail for preview only and was obtained with a 0.32 mm pitch, 3.5 MHz center frequency, and 128-element custom-made transducer electronically steered at +/−45° and focused at a depth of 70 mm. A one-cycle sine wave was used in transmission and 279 transmissions were used to reconstruct the image with the conventional delay-and-sum (D&S) method. The three display panels on the right hand side of the GUI show the reconstructed image (top), oscilloscope display of a selected RF A-line (middle), and RF A-lines from all transducer elements obtained from one transmission (bottom). The loop function shown at the upper left panel allows system to work in semi real-time. All the examples shown in this figure are for the illustration purpose only, which partially demonstrates that the system constructed works properly.

I.B.2. Safety of the HFR Imaging System for In Vivo Experiments

One of the primary applications of the HFR imaging system is for in vivo imaging of humans. This raises concerns of the safety of the system. Hence, the imaging system was tested with the parameters defined in [43]-[45] for two 1D-array transducers used in the experiments. The first is custom-made and has 128 elements, and a center frequency and −6 dB pulse-echo bandwidth of 3.5 MHz and 50%, respectively. The width is 8.6 mm in elevation dimension without elevation focus and the pitch is 0.32 mm that is about ¾ of the center wavelength of the transducer in water. The second transducer is an Acuson V2 phased array, with 128 elements, a 0.5 mm pitch, a 2.5 MHz center frequency, and a 14 mm elevation aperture focused at 68 mm.

Figures 14, 15:
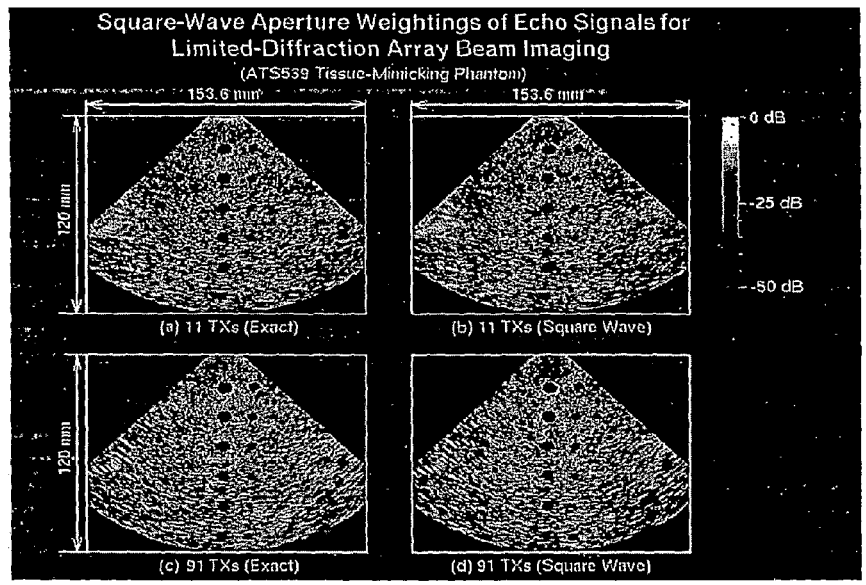
FIG. 14 is a table showing Mechanical index (MI), thermal index of soft tissues (TIS), and acoustic output (AO, or $I_{SPTA.3}$) of the HFR imaging system for two different transducers [43].
FIG. 15 shows reconstructed images of an ATS539 tissue-mimicking phantom with limited-diffraction array beam transmissions, where the transmission beams were produced with square-wave aperture weightings.

The Mechanical index (MI), thermal index (TI) (only the soft-tissue thermal index (TIS) is considered in this document for the intended applications of the system), and acoustic output (AO, or $I_{SPTA.3}$) [43]-[45] were measured for these transducers. The MI is defined as (see Eq. (1) of [43]):

$$MI = \frac{P_{r.3}/f_{awf}^{1/2}}{C_{MI}} \quad (19)$$

where $C_{MI}=1$ MPa MHz$^{1/2}$, $P_{r.3}$ is the attenuated peak-rarefactional pressure in MPa, and $f_{awf}$ is the acoustic working frequency in MHz. The subscript "0.3" represents 0.3 dB/MHz/cm attenuated values (notice that the dB definition for pressure and power is different). The TI, specifically, TIS, in scanned mode for soft tissue at the surface of transducer is given by (see Eqs. (2) and (11) of [43]):

$$TI = TIS = \frac{W_p}{W_{deg}} = \frac{W_{01}f_{awf}}{C_{TIS1}} \quad (20)$$

where $W_p$ is the power parameter, $W_{deg}$ is the estimated power necessary to raise the temperature of the target tissue by 1° C., $W_{01}$ (mW) is the acoustic power bounded by 1 cm soft tissue perfusion length, and $C_{TIS1}=210$ mW·MHZ is a constant. The AO is defined as [43]:

$$AO = I_{SPTA.3} = \max_{\forall (x,y)} \left\{ f_{pr} \int_{t_1}^{t_2} \frac{P_{.3}^2(\vec{r};t)}{\rho c} dt \right\} \bigg|_{z=constant} \quad (21)$$

where $P_{0.3}(\vec{r};t)$ is the attenuated pressure at the position $\vec{r}=(x, y, z)$ and time t, z is the distance from the transducer and is a constant at a given depth, $f_{pr}$ is the pulse repetition frequency (in calculation of FIG. 14, a non-scanned mode such as Doppler was assumed to obtain the highest values of AO)

$$\max_{\forall (x,y)} \{\cdot\}$$

means to find a peak value for all x and y at the depth z, $\rho$ and c are the density and the speed of sound of the tissue, respectively, and $t_1$ and $t_2$ are the time before the beginning and after the end of the pulse, respectively (i.e., $t_2-t_1$ is the time interval over which the envelope of the pulse is not zero).

In the measurement, one-cycle sine wave pulses at the respective center frequencies of the transducers were used. A pulse repetition period of 187 μs (5348 transmissions/s) was applied and the high-voltage power supplies were limited to +/−96V peak. Two imaging conditions were considered. One is for the standard D&S method where transmit beams are focused at different depths. The other is for the 2D and 3D HFR imaging [24]-[26], where a plane-wave type of transmit beams are used. The HFR imaging system was synchronized with a three-axis scanning system driven by stepper motors of up to 0.2 μm translation per step. Ultrasound fields in distilled water were measured across the entire beam areas along both the transverse and elevation directions of the transducers at various depths with a factory-calibrated needle hydrophone (NTR Systems, Inc.) of a 0.6 mm diameter and 25 μm thickness. Signals were digitized with a 12-bit Gage CS12100 computer card (Gage Applied Sciences, Inc.) at the 40 MHz clock of the HFR imaging system. Results are shown in FIG. 14.

FIG. 14 is a table showing Mechanical index (MI), thermal index of soft tissues (TIS), and acoustic output (AO, or $I_{SPTA.3}$) of the HFR imaging system for two different transducers [43]. The column "Depth" means where the parameters were measured. For focused beams, the "Depth" is also the focal length. For simplicity, the TIS was calculated by assuming a scanned mode with a scan length larger than 1 cm (the maximum values of the TIS are thus independent of the depths listed), while AO was obtained by assuming a non-scanned mode to show the highest values at the depths.

In in vivo experiments, the Acuson V2 transducer with a 68 mm elevation focal distance was used. Furthermore, only beams focused at 70 mm distance were used for D&S imaging. The upper U.S. Food and Drug Administration (FDA) limits of the MI and AO are 1.9 and 720 mW/cm$^2$, respectively [43]-[45]. Therefore, it is clear from FIG. 14 that our system is operating under the FDA limits for the HFR imaging related methods (using a plane-wave type of transmissions) and at about the limits with the D&S method. FIG. 14 also shows that the conventional D&S method may exceed the FDA limits as the focal distance of the transmission beam is decreased. For the HFR imaging related methods, the highest MI, TI, and AO occur near the surface of the transducer (notice that the elevation focus of the Acuson V2 probe moves the highest MI and AO a little away from the surface). The TI values in FIG. 14 indicate that there could be over 3.6° C. increase in temperature at the surface of the transducer. However, we did not feel it in the experiments. This could be due to the conservative estimation of the perfusion length of 1 cm used in the calculation.

The table also makes it clear that more power could be allowed for the HFR imaging related methods without exceeding the FDA limits on the MI and AO as compared to the conventional D&S method. This may increase the SNR of the HFR imaging related methods. This is because, as mentioned before, for a plane-wave type of transmission beams such as limited-diffraction array beams with square-wave aperture weightings and steered plane waves, the highest MI, TI, and AO occur at the surface of the transducers due to tissue attenuation, which is not the case for a tightly focused beam of the conventional D&S method. Because the MI is proportional to the peak rarefaction pressure and is capped at 1.9 by the FDA [43], a higher surface pressure (or more total transmission energy) could be allowed for a plane-wave type of beam than for a focused beam to increase the SNR. Nevertheless, to ensure the human safety, the American Institute of Ultrasound in Medicine (AIUM) suggests to follow the ALARA (as low as reasonably achievable) principle [43]-[45], i.e., a principle that mandates that ultrasound exposure (in terms of the MI, TI, and exposure time) be kept "as low as reasonably achievable" without compromising diagnostic capability or, resolution.

I.C. In Vitro and In Vivo Experiments and Results

Both In vitro and in vivo experiments were performed for the limited-diffraction array beam imaging with square-wave aperture weightings using the high frame rate (HFR) imaging system [39]-[40].

In the in vitro experiments, the custom-made 3.5 MHz transducer was used to transmit a one-cycle sine wave pulse at the center frequency. Echo signals were digitized at 40 MHz but were down-sampled to 10 MHz to reduce computation without compromising image quality. (The down sampling was performed for both the limited-diffraction array beam imaging and steered-plane wave imaging methods, but not for the D&S imaging where the image quality is sensitive to the phase accuracy of the echo signals [28]-[32].) Images were reconstructed with (16) where the maximum $k_{x_T}$ was determined by $k_{x_T\_max}=\pi/\Box x_1$, and where $\Box x_1$ was the pitch of the transducer [28]-[32]. This translates $k_{x_T\_max}$ into a maximum equivalent steering angle of about +/−40.34° at the center frequency of the transducer (notice that $k_{x_T}=k \sin \xi_T$ for $\theta_T=0$ in (5) and c=1450 m/s). To obtain images, $k_{x_T}$ was varied evenly from 0 to $k_{x_T\_max}$ to produce multiple limited-diffraction array beams. At each $k_{x_T}$, the square-wave aperture weightings corresponding to both the sine and cosine functions were applied (see (17) and (18)).

Figure 11:
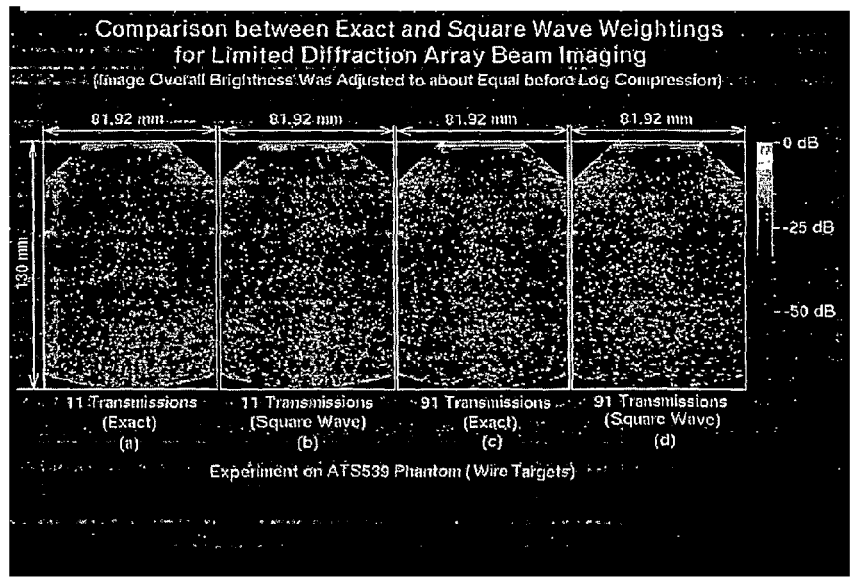
FIG. 11 shows reconstructed images of wire targets of an ATS539 tissue-mimicking phantom with limited-diffraction array beam method.
Figure 12:
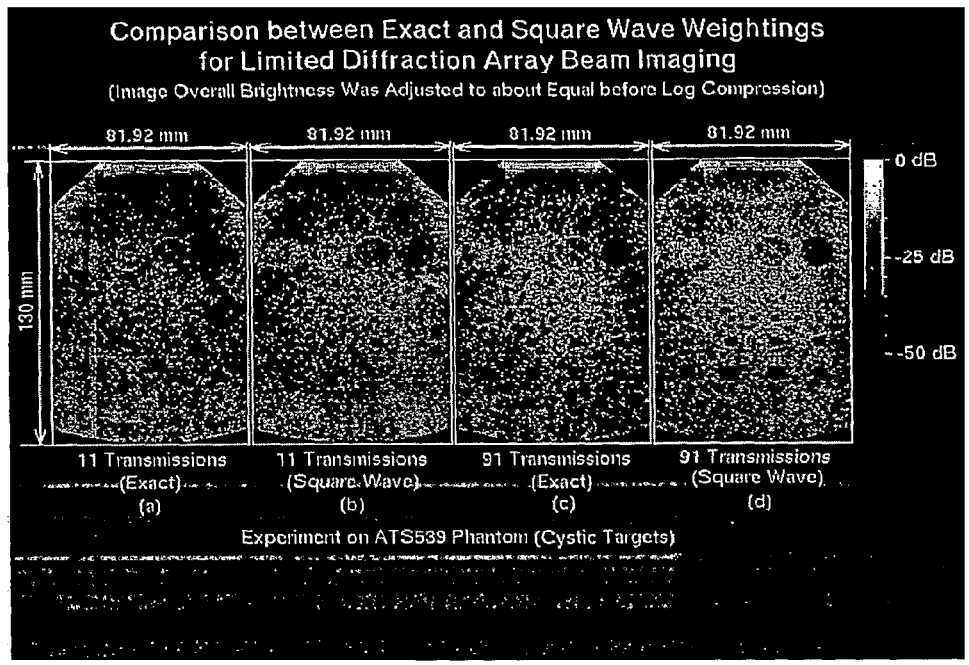
FIG. 12 is the same as FIG. 11 except that images of the cystic and grayscale targets of the ATS539 tissue-mimicking phantom were obtained.

Results for wire and anechoic cylinder targets of an ATS539 tissue-mimicking phantom are shown in FIGS. 11 and 12, respectively.

FIG. 11 shows reconstructed images of wire targets of an ATS539 tissue-mimicking phantom with limited-diffraction array beam method. Images are log-compressed with a dynamic range of 50 dB. The speed of sound of the phantom is about 1450 m/s. Images of the exact aperture weightings ((a) and (c)) are compared with those with the square-wave weightings ((b) and (d)), respectively. Images in the left and right two panels were obtained with 11 (up to 507 frames/s with 1450 m/s speed of sound) and 91 transmissions (up to 61 frame/s), respectively. The field of view of the images is larger than +/−45' over a 130 mm depth.

FIG. 12 is the same as FIG. 11 except that images of the cystic and grayscale targets of the ATS539 tissue-mimicking phantom were obtained.

It is clear that there is almost no difference between the images reconstructed with the exact (sine and cosine) and the square-wave aperture weightings, except that the latter has a higher SNR (deeper penetration) due to increased transmission power. In addition, since the square-wave aperture weightings need only one or two transmitters to obtain images, imaging systems may be simplified greatly, especially for future 3D imaging where a large number of independent transducer elements may be used.

Figure 13:
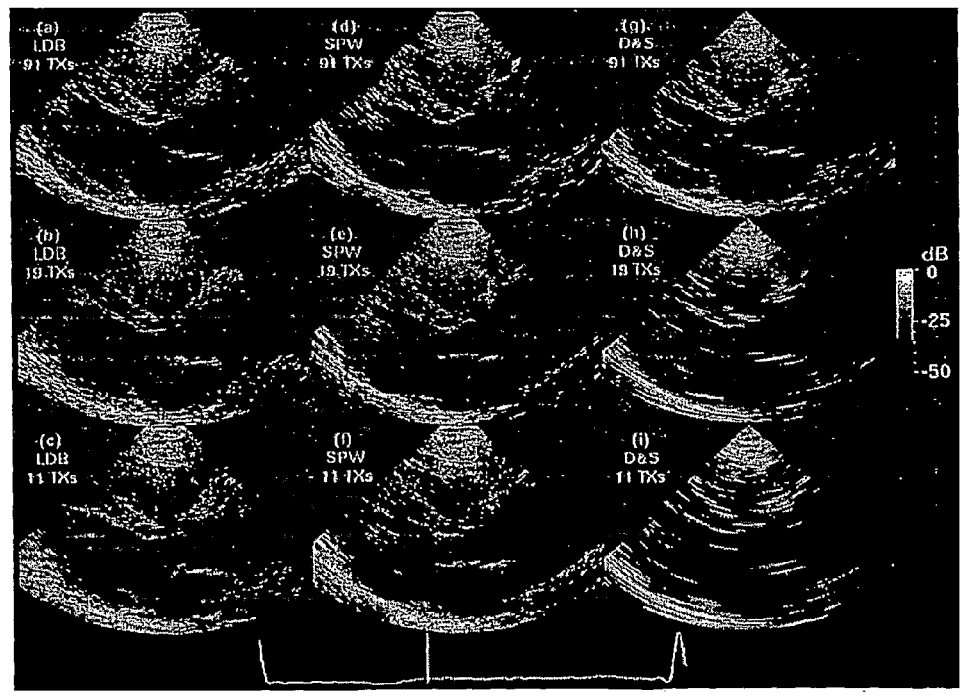
FIG. 13 shows In vivo heart images of a volunteer for comparison between limited-diffraction array beam imaging with square-wave aperture weightings (Panels (a), (b), and (c)) and other imaging methods (steered plane waves in Panels (d), (e), and (f), and D&S method in Panels (g), (h), and (i)). Panels in the top, middle, and bottom rows correspond to the conditions of 91 (59 frame/s with 187 μs between transmissions), 19 (281 frames/s), and 11 (486 frames/s) transmissions to reconstruct a frame of image, respectively.

Results of in vivo experiments of the heart of a volunteer using the 2.5 MHz Acuson V2 transducer are shown in FIG. 13.

FIG. 13 shows In vivo heart images of a volunteer for comparison between limited-diffraction array beam imaging with square-wave aperture weightings (Panels (a), (b), and (c)) and other imaging methods (steered plane waves in Panels (d), (e), and (f), and D&S method in Panels (g), (h), and (i)). Panels in the top, middle, and bottom rows correspond to the conditions of 91 (59 frame/s with 187 μs between transmissions), 19 (281 frames/s), and 11 (486 frames/s) transmissions to reconstruct a frame of image, respectively. Images are log-compressed with a dynamic range of 50 dB. The electrocardiogram (ECG) at the bottom of the figure was obtained from the same volunteer. The vertical bar in the ECG indicates the starting moment when the series of images in this figure were acquired (this was roughly the moment of a rapid ventricular filling that pushed the mitral valve open quickly).

The experiment conditions were the same as those of the in vitro experiments except that the center-frequency and dimensions of the transducer were different.

In the in vivo experiments, a commercial Acuson 128XP/10 imaging system was used to find the position of interest of the heart. After the position was found, the transducer was unplugged from the Acuson system and then plugged into the HFR imaging system for data acquisition. To compare the new imaging method with existing methods, the HFR imaging system was programmed to transmit in the order of steered plane waves (SPW) (11, 19, and 91 transmissions (TXs)), beams focused at 70 mm for D&S imaging (91 transmissions), and limited-diffraction array beams (LDB) with square-wave aperture weightings (91, 19, and 11 transmissions). This results in seven images showing successive phase delays of the heart in the sequence of Panels (f) (SPW with 11 TXs), (e) (SPW with 19 TXs), (d) (SPW with 91 TXs), (g) (D&S with dynamic receive focusing with 91 TXs), (a) (LDB with 91 TXs), (b) (LDB with 19 TXs), and (c) (LDB with 11 TXs), respectively, with a field of view of about 90° (+/450) for each image. (The field of view of both the steered plane wave and limited-diffraction array beam imaging is slightly larger than that of D&S because a strip, instead of a line, of the image is reconstructed from each transmission. In the steered plane wave imaging, the steering angles were evenly spaced from $-\xi_{T\_max}$ to $\xi_{T\_max}$, where $\xi_{T\_max}=45°$, and in the D&S imaging, the steering angles were chosen in such a way that their sine values were evenly spaced from $-\sin \xi_{T\_max}$ to $\sin \xi_{T\_max}$. For limited-diffraction array beam imaging, $k_{x_T\_max}$ was calculated using $k_{x_T\_max}=k_c \sin \xi_{T\_max} \leq \pi/\Delta x_1$, where $\Delta x_1=0.15$ mm, $k_c=2\pi f_c/c$, and where $f_c=2.5$ MHz and c=1540 m/s.). The image depth is 102 mm and the pulse repetition period is 187 μs, which is the shortest allowed by the imaging system at this depth. This results in frame rates of 486, 281, and 59 frames/s for 11, 19, and 91 transmissions, respectively. The group of transmissions ($2\times 11+2\times 19+3\times 91=333$ per group) above was repeated 18 times to cover an entire heart cycle with 5994 transmissions in total, lasting about 1.12 seconds.

From FIG. 13, it is clear that images obtained with the square-wave aperture weightings agree well with those obtained with the methods of both the steered plane waves and the conventional D&S with a fixed transmission focal distance of 70 mm but with a dynamic receive beam forming. As a comparison, for the D&S method, 19 and 11 transmissions were extracted evenly from the 91 transmissions over a +/−45° angle, and images were reconstructed with bilinear interpolations and are shown in FIGS. 13(h) and 13(i), respectively. These images show that for the D&S method, when the number of transmissions is reduced (frame rate is increased) while keeping the same 90° field of view, the quality of images degrades much faster than that of the HFR imaging related methods.

In addition to the in vivo imaging of the heart in FIG. 13, a study of the effects of motion on the HFR imaging related methods has been carried out. Results show that the HFR imaging methods are not sensitive to motion unless the number of transmissions is large (lower frame rate) and the depth is small. Effects of phase aberration and noise on the HFR imaging related methods have also been studied.

I.D. Summary—High-Frame Rate Imaging System and Square-Wave Aperture Weightings in Transmissions A general-purpose high-frame rate (HFR) medical imaging system has been developed. It works well and is an indispensable tool for the ultrasound research. It has been used to develop the square-wave aperture weighting method that is capable of reconstructing high-quality images (equivalent dynamic focusing in both transmission and reception) over a large field of view even for a fast moving object such as the heart with only one or two transmitters, which may simplify the transmission subsystem of an imager. The method may allow a higher total energy (or surface sound pressure) to be transmitted to increase the signal-to-noise ratio (SNR) than the traditional focused beam methods without exceeding the upper limits of some safety parameters set by the U.S. Food and Drug Administration (FDA). Due to the reciprocal principle, the method can also be applied to process echo signals in reception, which may further simplify the systems. In addition, the theory leading to the development of the square-wave aperture weighting method shows that the relationship between the limited-diffraction array-beam aperture weightings in reception and a 2D Fourier transform over the same aperture for a limited-diffraction array beam transmission can be generalized to an arbitrary transmission beam. This provides an alternative approach for image reconstructions and may help to develop new imaging methods in the future.

II. Square-Wave Aperture Weightings in Receptions

II.A. Method of Square-Wave-Aperture Weightings in Receptions

The theory of limited-diffraction-array beam imaging with square-wave aperture weightings for transmission beams given in Eqs. (6) and (7), it is clear that the ultrasound transmission and reception processes are exchangeable due to the reciprocal principle [49]. Therefore, the square-wave aperture weightings used in transmissions can also be applied to reception (see Eqs. (17) and (18)).

In the square-wave aperture weightings on echo signals received by the elements of an array transducer, the signals are directly summed and subtracted to produce a desired spatial frequency component according to the signs of the sine and cosine functions at the positions of the transducer elements. Such summations and subtractions can be done with analog circuits for realtime processing, of the echo signals, eliminating some high-speed digital circuits. This process can naturally obtain both phase and amplitude of multiple frequency components of the waves impinging on the surface of the transducer, and thus can be used as a spatial spectrum analyzer not only for ultrasound, but also for electromagnetic waves such as microwaves, as long as the Nyquist criterion is satisfied by the spatial sampling frequency of the array.

II.B. Experiment Results of Square-Wave Aperture Weightings in Receptions

II.B.1. In Vitro Experiments

To show the efficacy of the square-wave aperture weighting method on reception beamforming, we have performed in vitro experiments on an ATS539 tissue-mimicking phantom (ATS Laboratory, Inc.). The phantom consists of line, anechoid cylindrical, and grayscale cylindrical targets. In the experiment, a HFR general-purpose medical imaging system, was used to drive an Acuson V2 phased array transducer (Siemens, Mountain View, Calif.) of 128 elements, 0.15 mm pitch, and 2.5 MHz center frequency. In the experiment, a one-cycle sine wave at the center frequency was used. Radio frequency (RF) echo signals from each transducer element were digitized and stored in an SDRAM, and then transferred to a personal computer via a standard USB 2.0 port. The square-wave aperture weightings were applied to the received signals according to Eqs. (17) and (18). Reconstructed images of the phantom are shown in FIGS. 15 and 16, respectively, for limited-diffraction array beam [13], [14], [16] and steered plane wave [24], [34], [35], transmissions.

FIG. 15 shows reconstructed images of an ATS539 tissue-mimicking phantom with limited-diffraction array beam transmissions, where the transmission beams were produced with square-wave aperture weightings. A cross section of wire, an echo cylindrical, and grayscale cylindrical targets are shown at the left, middle, and right hand side of each image, respectively. A 128-element and 2.5 MHz Acuson V2 phased array transducer of 0.15 mm pitch was placed at the center top of each image and was in contact with the phantom surface. Images are log-compressed with a dynamic range of 50 dB. The speed of sound of the phantom is about 1450 m/s. The field of view of the images is larger than +/−45° over a 120 mm depth. Images of the exact limited-diffraction array beam weightings on received echo signals ((a) and (c)) are compared with those of the square-wave weightings ((b) and (d)), respectively. Images on the top and bottom rows were reconstructed with 11 (up to 549 frames/s with 1450 m/s speed of sound) and 91 (up to 66 frames/s) transmissions, respectively.

Figure 16:
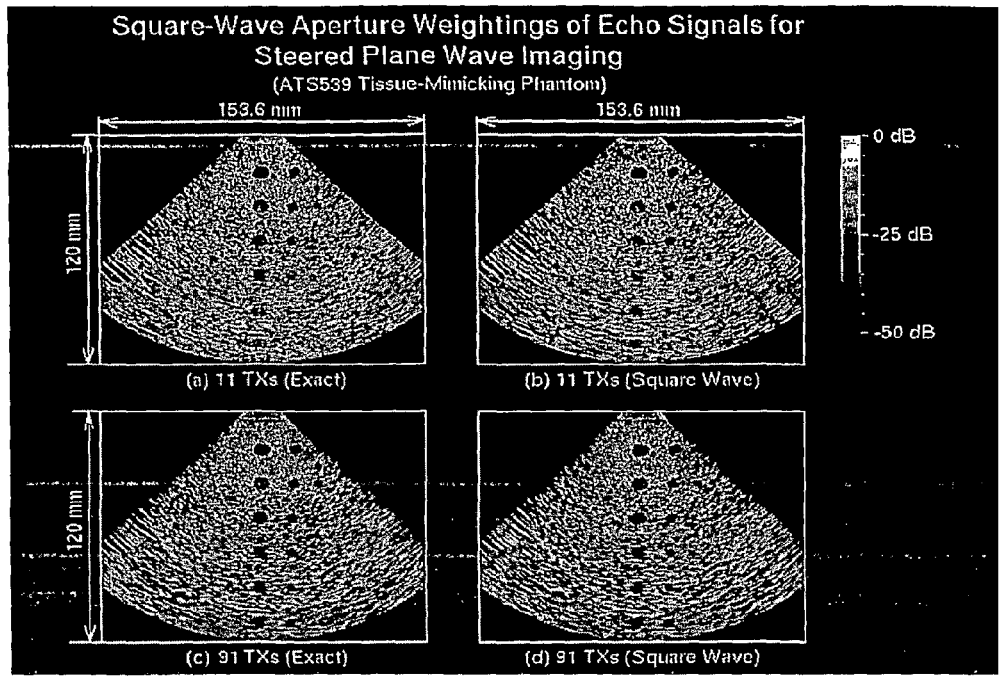
FIG. 16 is the same as FIG. 15, except that steered plane waves, instead of limited-diffraction array beams, were used in transmissions.

FIG. 16 is the same as FIG. 15, except that steered plane waves, instead of limited-diffraction array beams, were used in transmissions.

As mentioned in the previous paragraph, in FIG. 15, square-wave aperture weightings were also applied to transmissions. In both figures, Panels (a) and (c) are results of the exact limited-diffraction aperture weightings of the received echo signals, while Panels (b) and (d) are those of the square-wave aperture weightings. From the figures, it is clear that the quality of images reconstructed with the square-wave aperture weightings of the echo signals is about the same as that of images reconstructed with the exact weightings. As the number of transmissions is increased, the quality of images increases (compare Panels (c) and (d) with (a) and (b) respectively in both FIGS. 15 and 16).

II.B.2. In Vivo Experiments

In vivo experiments on human hearts and kidney of volunteers were also conducted with the HFR medical imaging system. The experiment conditions are the same as those of the in vitro experiments above. These conditions are also the same as those of FIG. 13 (for FIGS. 17 and 18), and FIGS. 13 and 14 of [31] (for FIGS. 19 and 20), except that the square-wave aperture weightings were applied to the received echo signals.

Figure 17:
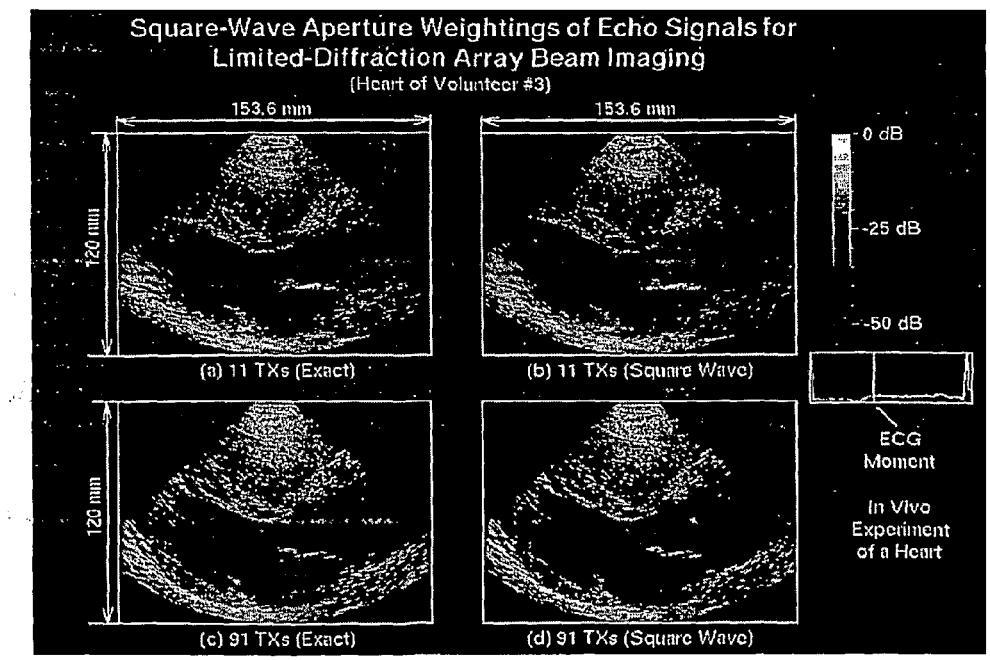
FIG. 17 shows In vivo images of the heart of a volunteer obtained with limited-diffraction array beam transmissions, where the transmission beams were produced with square-wave aperture weightings.

FIG. 17 shows In vivo images of the heart of a volunteer obtained with limited-diffraction array beam transmissions, where the transmission beams were produced with square-wave aperture weightings. The experiment conditions and image layout are the same as those of FIG. 15, except that the speed of sound is assumed 1540 m/s. The images were obtained near the moment when the mitral valve was pushed open rapidly (see the vertical bar in the box of the ECG curve on the right hand side of the figure). The time between adjacent transmissions was 187 μs, which was the shortest allowed by the home-made HFR imaging system at the depth. Images of the exact limited-diffraction array beam weightings on received echo signals ((a) and (c)) are compared with those of the square-wave weightings ((b) and (d)), respectively. Images on the top and bottom rows were reconstructed with 11 (up to 486 frames/s) and 91 (up to 59 frames/s) transmissions, respectively.

Figure 18:
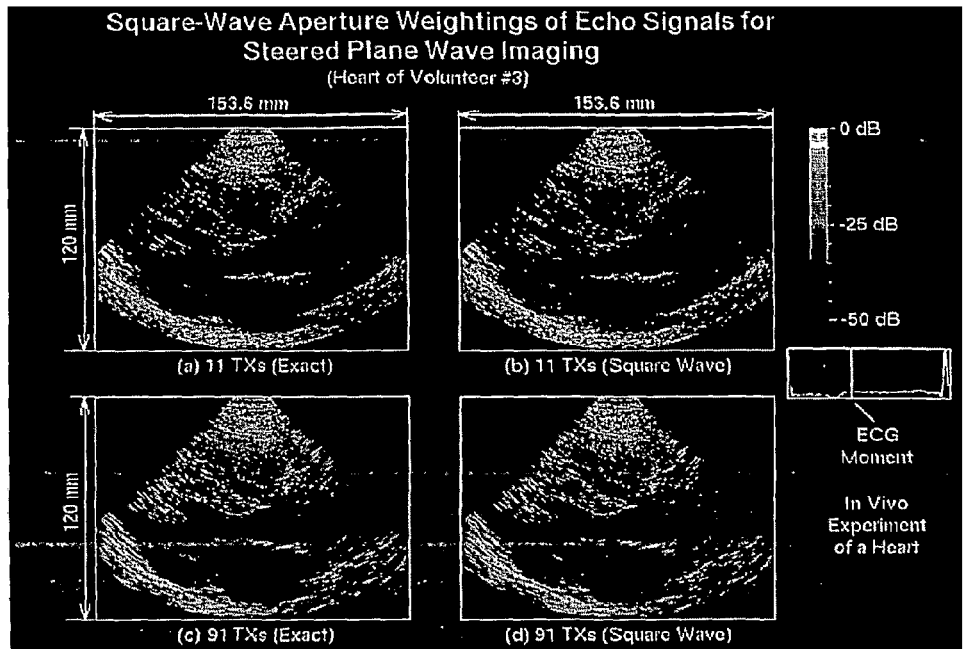
FIG. 18 is the same as FIG. 17, except that steered plane waves, instead of limited-diffraction array beams, were used in transmissions.

FIG. 18 is the same as FIG. 17, except that steered plane waves, instead of limited-diffraction array beams, were used in transmissions.

Figure 19:
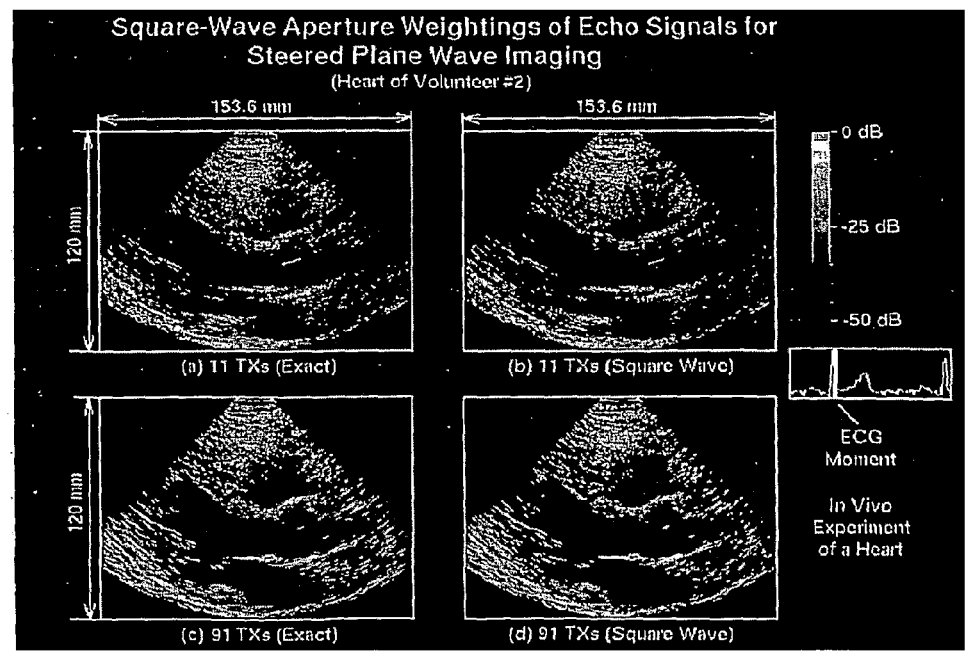
FIG. 19 shows In vivo images of the heart of a volunteer obtained with steered plane wave transmissions.

FIG. 19 shows In vivo images of the heart of a volunteer obtained with steered plane wave transmissions. The experiment conditions and image layout are the same as those of FIG. 17. The images were obtained at a moment shortly after the "R wave" peak (see the vertical bar in the box of the EC curve on the right hand side of the figure). Images of the exact limited-diffraction array beam weightings on received echo signals ((a) and (c)) are compared with those of the square-wave weightings ((be and (d)), respectively. Images on the top and bottom rows were reconstructed with 11 (up to 486 frames/s) and 91 (up to 59 frames) transmissions, respectively.

Figure 20:
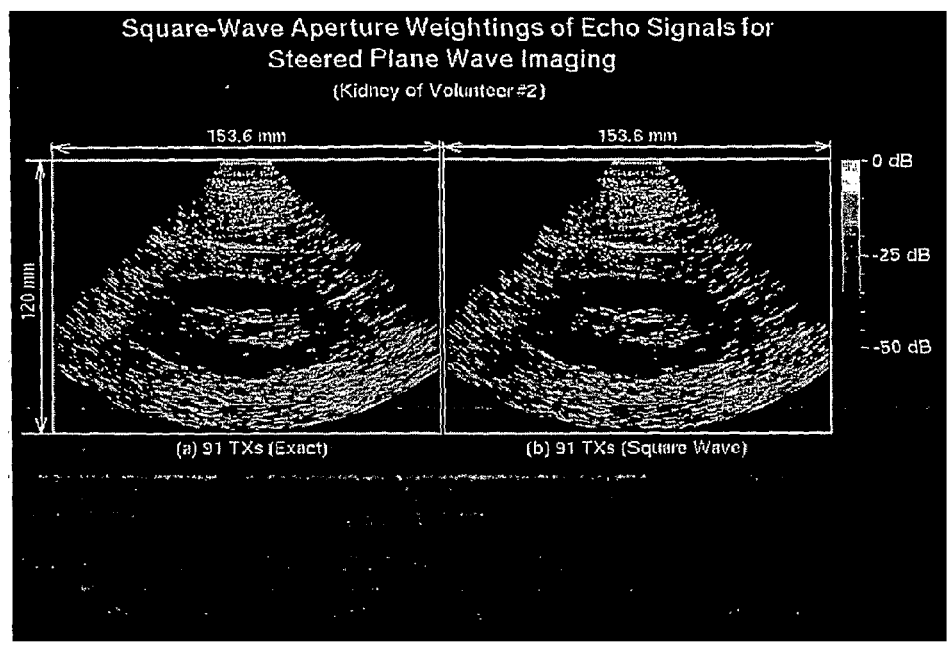
FIG. 20 shows In viva images of a kidney of a volunteer obtained with steered plane wave transmissions.

FIG. 20 shows In vivo images of a kidney of a volunteer obtained with steered plane wave transmissions. The experiment conditions and image layout are the same as those of FIG. 17. The image of the exact limited-diffraction array beam weightings on received echo signals (a) is compared with that of the square-wave weightings (b). The images were reconstructed with 91 transmissions, with the time between adjacent transmissions of 187 µs.

From the in vivo experiments, it is also clear that the quality of images reconstructed with the square-aperture weightings of echo signals is similar to that with the exact weightings for various transmission schemes.

II.C. Summary—Square-Wave Aperture Weightings in Receptions

The high frame rate (HFR) imaging method can be implemented with limited-diffraction array beam aperture weightings or 2D spatial Fourier transform over the transducer aperture. The limited-diffraction array beam aperture weightings can be approximated with square-wave aperture weightings to simplify the transmitter subsystem of an imager to allow only one or two transmitters to drive a fully populated array transducer. The limited-diffraction array beam aperture weightings on received echo signals are approximated with the square-wave aperture weightings to simplify electronic circuits for image reconstructions.

Both in vitro and in vivo experiments have been conducted with the HFR medical imaging system, as generally described herein. The results show that the square-wave aperture weightings on received echo signals are capable of reconstructing high-quality images as compared to those reconstructed with the exact limited-diffraction array beam aperture weightings.

Besides the imaging applications, the square-wave aperture weighting method can be used as a general-purpose realtime spatial spectrum analyzer for waves impinging on a receiver surface using simple analog addition and subtraction circuits as long as the spatial Nyquist sampling criterion [54] is satisfied, producing both amplitude and phase of signals in applications such as ultrasound and microwaves.

III. Method and Apparatus for Producing a High Frame Rate (HFR) High Resolution and High Contrast Image III.A. Square-Wave Aperture Weightings Using the HFR imaging system and based on the extended HFR imaging method we have developed a new limited-diffraction array beam imaging method with square-wave aperture voltage weightings. In this method, two transmitters that have the same output amplitude but of an opposite sign are used to excite transducer elements to produce limited-diffraction array beams with two levels of quantization. In each transmission, one of the two transmitters is selected for each transducer element through a switch according to the sign of the sine and cosine functions (limited-diffraction array beam weighting functions) at the location of the element.

The method can also be implemented with a single transmitter to reduce further the number of transmitters. However, this may reduce the transmission power and increase the image reconstruction complexity. The method has several advantages. Firstly, it reduces the number of transmitters needed and thus may simplify the transmitter subsystem of an imaging system, especially, for systems that use transducers of a large number of elements such as a 2D array. This is the case when compared to both the conventional D&S method, where one transmitter is usually required for each transducer element due to the delay of transmission signal for beam focusing or steering, and the extended HFR imaging method, where a large number of transmitters are used for exact limited-diffraction array beam aperture weightings. This is significant because modern transmitters are complicated and bulky due to the requirements that they must transmit broadband radio frequency (RF) arbitrary waveforms, work ara high output voltage, and have a large static current or power to improve linearity for applications such as nonlinear imaging [41] and coded excitations [42]. Secondly, because there is no amplitude tapering of voltage over the transducer aperture, the method increases transmission power, and thus the signal-to-noise ratio (SNR) of the system. Thirdly, according to the reciprocal principle, the square-wave aperture weightings can also be applied to reception (echo signals) to replace some high-speed digital signal processing in image reconstructions. Finally, combined with the HFR image reconstruction algorithms that use the fast Fourier transform (FFT) [24]-[27], the method is useful to develop high-quality 3D imaging systems that require fully addressable 2D array transducers of a large number of independent elements.

To show the efficacy of the square-wave aperture weighting method, both in vitro and in vivo experiments were carried out with the HFR imaging system. For simplicity, 2D, instead of 3D, images were reconstructed. In the in vitro experiment, a custom-made, 128-element, 0.32 mm pitch, and 3.5 MHz center frequency linear array transducer with about 50% fractional bandwidth was used to obtain images of an ATS 539 tissue-mimicking phantom (ATS Laboratory, Inc). In the in vivo experiment, an Acuson V2 phased array transducer (128 elements, 0.15 mm pitch, and 2.5 MHz center frequency) was used to get images of a human heart for an entire heart cycle. Results show that the quality of images obtained with the square-wave aperture weighting method is higher than that with the exact limited-diffraction array beam weightings of the extended HFR imaging due to an increased SNR. The in vivo experiments indicate that the method also works well for fast moving organs such as the heart. As a comparison, results obtained with steered plane wave transmissions and focused beam (focused at 70 mm) transmissions of the conventional D&S method with dynamic focusing in reception are also shown.

To ensure the safety in the in vivo experiments, the mechanical index (MI), thermal index (TI), and acoustic output (AO or $I_{SPTA.3}$, the attenuated spatial-peak temporal-average intensity) of the system were measured for the two transducers used in the experiments [43]-[45] (see FIG. 14). Results show that a higher pressure at the transducer surface may be allowed to increase the SNR for a plane-wave type of beams such as those produced with the square-wave aperture weightings than the traditional focused beams without exceeding the upper limits (such as 1.9 for the MI) of the safety parameters [43].

According to the reciprocal principle, the square-wave aperture weighting method can also be applied to the reception beamforming to approximate the exact sine and cosine limited-diffraction array beam weightings. This allows simpler analog summing and subtracting circuits to be used to produce all the spatial frequency components of echo signals simultaneously in realtime and may replace some high-speed digital circuits that are otherwise needed without significantly affecting the quality of images reconstructed.

In addition to the imaging applications, the square-wave aperture weighting in reception can also be used as a general-purpose realtime spatial spectrum analyzer for waves impinging on the transducer surface. This is similar to using an optical lens to obtain a realtime-two-dimensional (2D) spatial Fourier transform at either the focal distance or in the Fraunhofer region (far field) for thin objects placed against the lens aperture [54]. Unlike the Fourier optics where the phase information is usually ignored, the square-wave aperture weightings can naturally obtain both phase and amplitude of signals for applications such as ultrasound and microwaves.

III.B. Methods of Producing HFR Image

In one non-limiting embodiment, the system for producing a high frame rate, high resolution and high contrast image, includes: a) transmitting a group of signals of energy toward one or more objects to be imaged, the signals being weighted spatially on one or more transmitting apertures i) by square waves, or ii) by limited-diffraction beams; b) weighting or Fourier transforming receive signals spatially on one or more receiving apertures; c) reconstructing a two- or three-dimensional image data set from i) the transmitted signals, and, ii) the receive signals; and, d) reconstructing the image from the image data set of step c.

In another non-limiting embodiment, the system for producing a high frame rate, high resolution and high contrast velocity vector image of one or more objects where at least a part of one or more objects is moving, includes: a) transmitting two or more groups of signals of energy toward the one or more objects, the signals being weighted spatially on one or more transmitting apertures i) by square waves, or by limited diffraction beams; b) weighting or Fourier transforming receive signals spatially on one or more receiving apertures; c) reconstructing two- or three-dimensional image data sets from the groups of: i) the transmitted signals, and, ii) the receive signals; and; d) using the image data sets to reconstruct: i) a first set of flow velocity component images in a first direction, and ii) a second set of flow velocity component images in a second direction that is different from the first direction; and, e) reconstructing one or more velocity vectors image from the first and second sets of velocity component images.

The steps a), b) and/or c) in the above embodiments can be performed a plurality of times.

The system can include an embodiment, where, in step a), each group may contain one or more signals, each of which is produced with one transmission.

In certain non-limiting examples, the square-wave aperture weightings can be replaced with limited-diffraction beam weightings for step a) or step b), or for both steps a) and b)).

Also, the square-wave aperture weightings on the received signals can be performed with analog summers and subtractors. The summers and subtractors can be of multiple stages to reduce the number of inputs of each summer and subtractor.

Also, the aperture weightings on the receive signals can be used as a spatial analyzer for waves impinging on the surface of a receiver. The spatial analyzer receives phase and amplitude of the spatial frequency components of the waves, or, is configured to receive real and imaginary parts of spatial frequency components of the waves.

In another non-limiting embodiment, a transmit signal is a broadband or narrowband signal. The transmit signal can be, for example, a coded signal such as a chirp, Golay code, or m-sequence.

In a particular, embodiment, the receive signals are received echo signals that can be densified by various interpolation methods such as zero-padding, cubic spline interpolation, and others before Fourier transforms or interpolations.

Further, in certain embodiments, the beam steering is a linear phase shift in frequency domain to rotate beams that can be applied to one or more of: received echo signals before limited-diffraction array beam weightings to increase image reconstruction quality, reduce digital noises, and to reduce computations.

The step c) can include Fourier transforming along a time domain of one or more of: i) the weighted transmitted signal, or ii) the spatial Fourier transform, whereby a multi-dimensional k-space data set is formed. In certain embodiments, a window function is applied to one or more of: transmit signals in time domain, transmit signals over transducer aperture, data sets of echo signals in time domain, data sets of echo signals over transducer aperture, data sets of Fourier transform of echo signals, data sets of interpolated Fourier transform, and data sets of Fourier transform corresponding to each transmit weighting or beam steering.

In one particular embodiment, the step c) can include: i) interpolating a multi-dimensional k-space data set to produce rectilinear multi-dimensional k-space data sets; and, ii) performing inverse Fourier transformations of the interpolated rectilinear multi-dimensional k-space data sets along each of its dimensions to produce the image data set. The k-space data sets can have two- or three-dimensions, and the inverse Fourier transformation can be performed along each of the two- or three-dimensions to produce a two- or three-dimensional image data set.

Also, masks can be applied to partially constructed images to remove unwanted digital noise for both limited diffraction beam and steered plane wave methods. In certain embodiments, a plurality of the single transmit spatial frequency signals and the multiple receive spatial frequency signals can be combined to one or more of: increase signal-to-noise ratio, image resolution, image contrast, reduce sidelobes for the image through coherent superposition, and reduce speckle noise by incoherent superposition. Also, the system can include combining a plurality of the multiple transmit spatial frequency signals and the multiple receive spatial frequency signals to one or more of: increase signal-to-noise ratio, image resolution, image contrast, reduce sidelobes for the image through coherent superposition, and reduce speckle noise by incoherent superposition.

In one particular non-limiting embodiment, constructed 3D images are volume rendered or surface rendered images.

The signals can be transmitted with a one-dimensional or two-dimensional array transducer. The transducer can be a capacitive micromachined ultrasound transducer (CMUT) or a piezoelectric transducer. In certain embodiments, a single transmitter is used to produce weightings for different transducer elements. In other embodiments, more than one transmitter is used to produce weightings for different transducer elements. In each transmission, one of the two transmitters, can be selected for a transducer element through a switch according to the sign of the sine and cosine aperture weighting function at the location of the element. In one particular embodiment, the step a) and step b) are performed using the same transducer array.

In another embodiment, one group of transmitted signals is used to reconstruct an image. In another embodiment, at least two groups of transmitted signals are used to reconstruct an image.

The received signals can be echo signals that are separated from transmit signals with a transmit/receive (T/R) switch. The received echo signals can be filtered with active or passive analog filters, or digital filters to avoid aliasing and reduce noise. The received echo signals can be amplified with a time-gain-control (TGC) amplifier. Also, the which received and amplified echo signals can digitized with a analog-to-digital converter (ADC). Further, the received echo signals can be weighted with limited-diffraction beams of different parameters either before or after analog-to-digital conversion. The received and digitized echo signals can be stored in memory.

III.C. Apparatus to Produce HRF Image

As generally described above with respect to FIGS. 3-9, there is provided a system for producing a high frame rate, high resolution and high contrast image of one or more objects. The system can include: 1) one or more devices to: a) transmit a group of signals of energy toward the one or more objects, the signals being weighted spatially on one or more transmitting apertures: i) by square-waves, or ii) by limited diffraction beams; and b) weight or Fourier transform a group of receive signals spatially on one or more receiving apertures; 2) one or more devices to reconstruct a two- or three-dimensional image data set from the transmitted signals and the receive signals; and, 3) one or more devices to reconstruct the image from the image data set.

To transfer a large among of data from an array transducer to an imaging system for image reconstruction, high-speed data links are used. Signals from multiple elements of an array transducer are combined into high-speed data streams that are transferred via fewer optical fibers than the number of elements of the transducer.

The transmit signals can be weighted spatially on one or more transmitting apertures to produce a linear time delay. Also, the transmit signals can be weighted spatially on one or more transmitting apertures by square waves of a single spatial frequency but of different phases. In certain embodiments, the receive signals are weighted by multiple square waves of different spatial frequencies. In other embodiments, the receive signals are weighted by performing a-spatial-Fourier transform.

Also, in certain embodiments, the transmit group comprises one or more limited-diffraction beams or their square-wave approximations. In one non-limiting example, the transmitted signals comprise sine and cosine spatially weighted signals or their square-wave approximations.

The systems described herein can include two arbitrary-waveform transmitters, a first transmitter having an output voltage amplitude and a second transmitter having an inverted output of the same voltage amplitude. In certain embodiments, the system includes two transmitters, where one of the two transmitters is selected for a transducer element through an electronic switch according to the sign of the sine and cosine aperture weighting function at the location of the element and is controlled by a digital logic. The system can also include transducer elements switched between an output voltage of fixed amplitude of only one transducer and no output.

IV. High Frame Rate Imaging System
IV.A Description of the System

Figure 1:
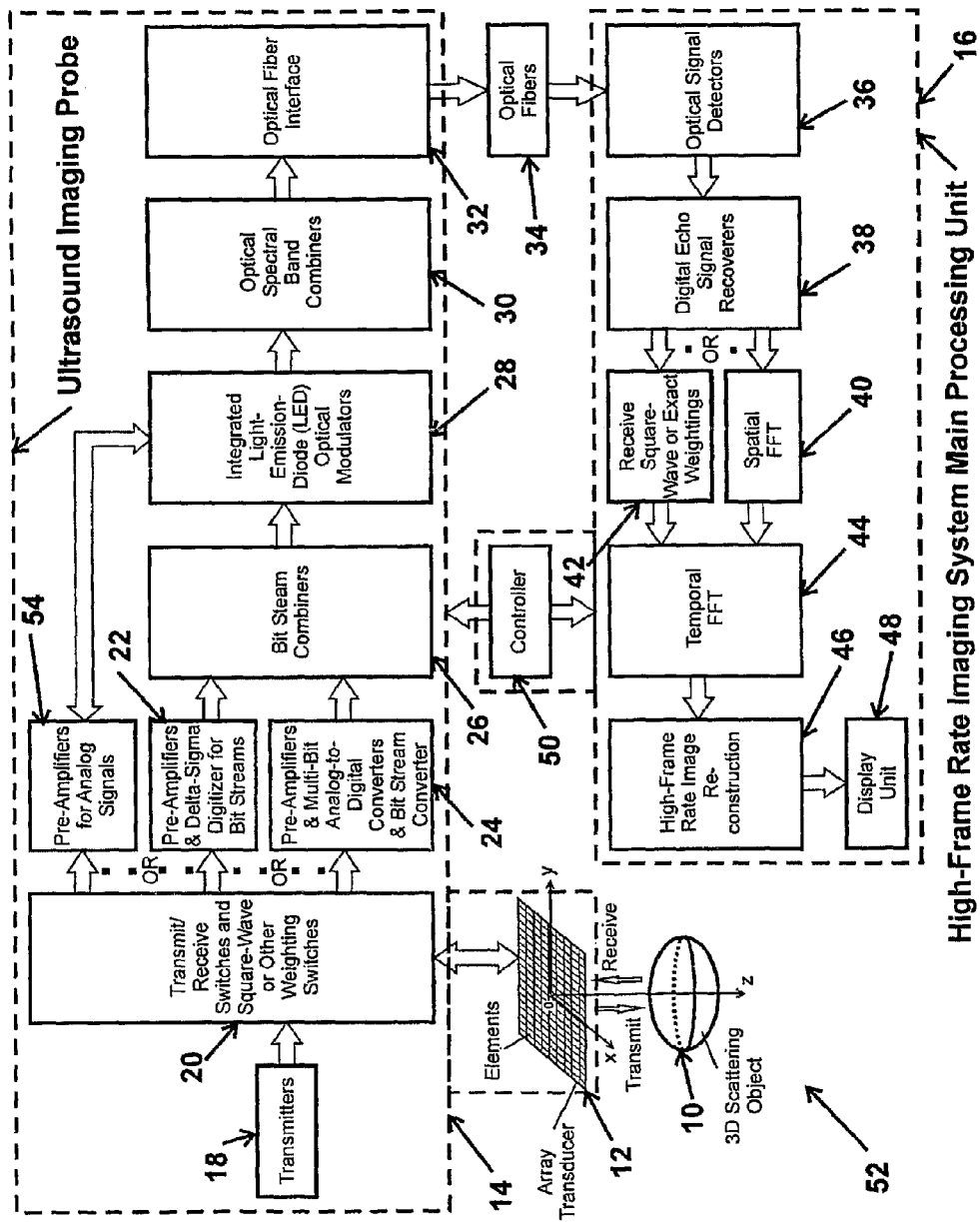
FIG. 1 is a system block diagram that includes both optical processing subsystems and square-wave aperture weighting and image reconstruction subsystems.

FIG. 1 is a general structure diagram of one embodiment of an imaging system 52. It is to be understood that the energy of the signals can be, for example, but not limited to ultrasonic, electromagnetic, radar, microwave and the like. In the embodiment shown, the imaging system 52 includes a 2D array transducer 12 comprised of a plurality of elements. The array transducer 12 driven by a transmitter 18 transmits at least one signal "Transmit" having a central frequency and wide fractional bandwidth (i.e., bandwidth divided by the central frequency) to a 3D object 10. A receive signal "Receive" (i.e., an echo reflected from a three-dimensional object) is received by the array transducer 12 and the resulting signals from each of the separate elements of the array transducer 12 is processed as described below.

For 2D- or 3D imaging, the inter-element distances of the array transducer 12 along the x and y axes are determined by the highest spatial frequencies of $k_x$ and $k_y$, respectively. In certain embodiments, the inter-element distance in the 2D array transducer 12 can be much larger than a fully sampled 2D array transducer 12 used in the imaging system 52 for electronic steering. It is to be noted that each transducer element can be sub-diced.

The signal energy is generated by the transmitter 18 for a short time period. The signal energy is applied through a transmit/receive (T/R) switch 20 to all of the elements in the array transducer 12. The signal energy is weighted and/or delayed and is applied to the elements of the array transducer 12 to launch the wave signal (for example, a resulting limited-diffraction array beam or plane wave).

The transmitter 18 can consist of one or two transmitters to implement square-wave aperture weightings to produce approximated limited-diffraction beams.

The transmitter 18 should contain more transmitters if phase-delays are applied to the array transducer 12.

The transmit/receive (T/R) switches and square-wave or other weighting switches 20 can produce square-wave aperture weighted transmission energy.

The individual receive signals "Receive" received by each transducer element in the array transducer 20 are coupled through the T/R switches 20 during a receive mode. In certain embodiments, the receive signals "Receive" are sent to the weighing or T/R switch 20 and/or receive square wave or exact weighting circuits 42 and are weighted and summed to produce spatial-frequency components (i.e., $k_{x1}, k_{x2}, \ldots, k_{xm}$, $k_{y1} k_{y2}, \ldots, k_{ym}$). The receive signals "Receive" are weighted to produce limited diffraction receive beams.

In another embodiment, the receive signals "Receive" are sent to a spatial FFT element 40 and undergo Fast Fourier Transform (FFT).

The receive signals "Receive" are pre-amplified and then digitized by pre-amplifiers and delta-sigma digitizer for bit streams 22 to produce digital bit streams. In some embodiments, the receive signals "Receive" are pre-amplified and then digitized by a multi-bit analog-to-digital converter and bit stream converter 24 to produce digital bit streams.

The bit streams are combined to form bit streams of a higher data rate to reduce the number of signal channels with a bit stream combiner 26.

The bit streams are used to modulate the integrated light emission diodes (LED) 28 or other light modulators to produce modulated optical signals.

In some embodiment, the analog signals are pre-amplified by a pre-amplifier for analog signals 54 and directly sent to the light emission diodes (LED) 28 or other light modulators to produce analog modulated optical signals.

The optical signals of different spectral bands are combined with a wavelength-division multiplexing optical spectral band combiner 30 or other light combination devices to allow fewer fibers to carry more optical signals simultaneously.

The optical signals are interfaced by an optical fiber interface 32 to connect to optical fibers 34 to transfer data to a main image reconstruction system 16.

In some embodiments, the array transducer 12 and processing components from 18-32 and or 54 can be housed in an ultrasound probe 14.

The optical signals from the optical fibers 34 are converted back to electrical signals by optical signal detectors 36 and digitals or analog echo signals are recovered by a digital echo signal recoverer 38 for all transducer elements. The echo signals are weighted with square-wave aperture weightings or with exact aperture weighting circuits 42 to produce receive limited-diffraction array beams. In some embodiment, the spatial FFT circuits 40 are used to produce the same weighting effects.

The weighted signals are processed with a temporal FFT 44 and then by the established high-frame rate image reconstruction element 46 to reconstruct images to display by a display unit 48.

A controller 50 is used to coordinate the operation of the entire imaging system 52.

Also, in certain embodiments, the imaging system 52 can instead, include the pre-amplifier 54 for receiving, amplifying and transmitting the analog signals to the integrated light emission diodes (LED) 28 or other light-modulators to produce modulated optical-signals.

IV.B. Analog-Signal Digitization and Transfer through an Optical Link

One of the biggest difficulties for 3D imaging with a 2D array transducer is that a 2D array may have tens of thousands of transducer elements inside a small probe area of such as 2 cm×2 cm. These tiny transducer elements have very small energy and it is difficult for them to drive a cable of a few feet long without significant loss of signals. Because the number of elements is large, the cable would be too thick to be practical even if the transducer elements could drive a long cable.

In yet another aspect, there is provided a system for producing a high frame rate, high resolution and high contrast image that includes an array transducer probe operatively linked via an optical link to an imaging system.

The system can include one or more suitable devices capable of converting at least the received signals to optical signals. The system can also include a device capable of digitizing at least the received signals. The preceding claims, further including one or more devices capable of converting analog signals to multi-bit digital signals. Devices that can convert analog signals with delta-sigma digitizers configured to produce bit streams. Also, a device can combine one or more bit steams and funneling multi-channel data into higher-speed bit steams with fewer channels. Devices that can then convert electrical bit streams to optical signals. The multi-channel optical signals can be combined into a smaller number of channels. The channels of optical signals are recovered into the original received electrical signals.

In one embodiment, the high frame rate imaging system can use optical fibers to transfer a large amount of data at a high speed. The optical fibers can transfer about $14 \times 10^{\wedge}12$ bits/s (terabits/s) through a single optical fiber over one segment of fiber of 160 km. More data could be transferred if the fiber needed is only a few feet long (the product of data rate and fiber length is of about a constant).

In one non-limiting example, one application for the present inventive system is the use of the high frame rate imaging system with a Vertical-Cavity Surface Emitting Laser (VCSEL) to produce optical signals and to communicate among different Central Processing Units (CPUs) or among digital signal processors of the imaging system.

In another application is the use of the high frame rate imaging system with optical links that are in the next generation of CPUs.

In yet another application is to use the optical CPUs mentioned above with the high-frame rate imaging system. To make the system compact and low power while running at a much higher speed but much cooler as compared to copper-wired CPUs.

In another application, the present high frame rate imaging system is used with optical communication techniques to transfer data from a 2D ultrasound array transducer to an imaging system. In one non-limiting example, the high frame rate imaging system includes a high-speed link for ultrasound 2D array transducers. Such data transfer method can be especially useful in an ultrasound high frame rate imaging systems, as described herein. In one embodiment, the high frame rate imaging system uses the full capability of a 2D array to obtain a high-quality image and transfers data out of the transducer (probe) using one or more optical fibers.

In one square-wave aperture weighting imaging method described herein, the fiber-based system can use only two transmitters that can be easily integrated into the ultrasound probe. Without the square-wave aperture weighting imaging system, even if the optical fiber could be used to transfer echo data received from the transducer, it would still be difficult to use tens of thousands of conventional coaxial cables to send high-voltage signals to drive all the elements of transducer to produce ultrasound, defeating the purpose of using optical fibers.

IV.C. Methods to Produce High-Speed Optical Signals Inside an Ultrasound Probe

IV.C 1—Digitize Analog Signals

In certain embodiments, ultrasound echo signal of each transducer element is digitized with, for example, 40 MHz, 12-bit A/D converter. The data is serialized into 1-bit stream at a higher rate, 480 Mbits/s. Then use electronics to further increase the data rate, and use an optical wavelength-division multiplexing to combine data from multiple elements (say 1,000) to a single fiber. If an ultrasound array has 16,384 elements, we need about 17 fibers, each of which has a diameter of a few micrometers. The number of fibers could be reduced if the data could be packed into a rate that is even higher before converting to optical signals.

IV.C 2—Delta-Sigma 1-bit Digitization

Digitizing the signal of each transducer element with a Delta-Sigma 1-bit digitization technique.

In one system, the multidimensional image is produced by using Delta-Sigma sampling and digitizing (or other sampling techniques such as a multiple-bit analog-to-digital conversion) of signals received by each transducer element to produce a bit stream. The multiple bit streams from multiple transducer elements are combined into one or more bit steams that have a higher bit rate or data rate. One or more optical emitters with one or more bit streams of a high data rate are modulated to produce digital optical signals. The digital optical signals are transferred via one or more optical fibers to a separate imaging system where the digital optical signals are reproduced back into electrical digital signals that represent the original echo signals produced by all of transducer elements. Images are then constructed with an extended high-frame rate imaging method.

The high frame rate imaging system can be housed in an ultrasound probe that can be held by a physician to move around patient's body. In such embodiments, the imaging system can be external to the probe and can be linked by the optical fibers to the probe for transferring signals for reconstructions of multi-dimensional images.

The transducer housed in the probe is weighted along its spatial dimensions with square-wave aperture weightings (the square-wave aperture weightings can be applied to either transmission or reception beam, or both). The signals transmitted from at least one element of a transducer array form limited diffraction transmitted beams. The echo signals received at the separate elements are weighted to form limited diffraction receive beams or Fourier transformations of the received signals. Coherent or incoherent superposition of spectra or sub-images obtained from multiple transmissions of the same or different aperture weighting parameters then form a final image.

In certain embodiment, the system can use an over-sampling rate of up to 1.28 GHz to achieve an accuracy of the previous method (assuming the maximum ultrasound frequency is about 10 MHz) by the delta-sigma 1-bit digitizer. The system can be constructed with an established integrated circuit process that may consume less overall power within the probe. Then, suitable electronics can be used to further increase the data rate. The resulting bit stream can directly control a laser on/off switch to convert electrical digital data to optical data. The number of fibers needed depends on the number of channels of signals that can be sent over a single fiber simultaneously as explained above.

IV.C 3—Fiber Optics for Analog Receive Signal Transfer from Probe to Imaging System Transfer analog echo signal of transducer elements through optical fibers without digitization. Use the signals plus a proper DC bias to modulate laser diodes to send the analog signals through optical fibers directly. The number of fibers needed depends on the number of channels of signals that can be sent over a single fiber simultaneously as explained above, too. This method may be more subject to various distortions due to the imperfection of the system.

IV.C.4—Fiber Optics for General-Purpose Ultrasound Receive Signal Transmission

The fiber-optic receive signal transmission system can be used with any image reconstruction method, including conventional imaging methods to transfer signals received by a multi-dimensional array transducer to an image formation system.

In one non-limiting embodiment, a delta-sigma digitizer and optical fibers provide an especially useful system that solves potential interconnection problems of a high-frame rate ultrasound imaging system at a reasonable costs.

IVC.5—General Purpose High Frame Rate Imaging System

A high frame rate imaging system can include a device capable of recording radio frequency (RF) data from one or more transducer elements for at least one heart cycle. The RF data is synchronized to an electrocardiogram (ECG) signal at a desired frame rate, as determined by ultrasound propagation speeds and system timing overhead. The system can include one or more independent linear power transmitters and associated fast transmit/receive (T/R) switch for each transducer element. The device can include, or be operatively connected to a device capable of storing the acquired RF data and/or transferring the stored data to a computer for one or more of signal processing and image reconstructions.

IV.D. Velocity Imaging Using High Frame Rate Imaging System

IV.D.1 Doppler Effect Using High Frame Rate Imaging System

The Doppler effect measurements can be used with the square-wave aperture weightings or the steered plane wave transmission methods to obtain flow images. In certain embodiments, at least a part of the object to be imaged is moving. In one embodiment, blood flow vector images are reconstructed with one or more of: a Doppler method, a color flow autocorrelation method, a cross-correlation method, a B-flow method, a motion detection methods that are unique to the square-wave (limited diffraction beam) aperture weightings, and a combined Doppler and cross-correlation method.

The images are reconstructed from different receive angles but with the same transmissions are used to reconstruct flow velocity component images. In certain embodiments, the first direction is perpendicular with respect to a surface transmitting the signals. A single image can be used to construct the first and second sets of flow velocity component images by rotating the single image and interpolating data from the rotated image.

The system can be configured to transmit more than one beam at the same spatial frequency or steering angle in order to obtain a velocity component image and to improve signal-to-noise ratio.

IV.D.2 B—Flow Using High Frame Rate Imaging System

The high frame read imaging system can also be used to obtain flow velocity images with the conventional B-flow techniques.

The B-flow technique can also be used with the square-wave aperture weightings or the steered plane wave transmission methods to obtain flow images.

IV.D.3. Power Doppler Imaging Using High Frame Rate Imaging System

The Power Doppler imaging can also be used with the square-wave aperture weightings or the steered plane wave transmission methods to obtain flow images.

IV.D.4. Harmonic Imaging Using High Frame Rate Imaging System

The methods as recited herein are also useful for conducting harmonic imaging using either pulse inversion or filtering techniques.

IV.D.5 Elasticity Imagine Using High Frame Rate Imaging System

The methods as recited herein are also useful for conducting elasticity imaging or strain rate imaging using the high frame rate imaging system.

IV.E. Broad Application of High Frame Rate Imaging System

The system can include a transmit/receive device that has one or more of: i) a transducer array configured to form one or more limited-diffraction transmitted beams, or ii) steer a plane wave (or other beam) at one or more angles. The transmit signals and the receive signals can be formed by the same transducer array. Also, the receive device can be configured to: i) Fourier transform the weighted receive signals to form at least a first multi-dimensional k-space data set; ii) interpolate one or more multi-dimensional k-space data sets to produce rectilinear multi-dimensional k-space data sets; and, iii) perform inverse Fourier transformations of the interpolated k-space data sets along each of its dimensions, whereby the image data set is produced. Also, the system can further include one or more devices capable of amplifying at least the receive signals.

IV.F. Other Considerations

Also, in certain embodiments, the receive signals can be focused dynamically or focused at a fixed depth through mechanical or electrical means. In one non-limiting example, the receive signals are focused electronically with delay-and-sum methods.

Also, in certain embodiments, the receive aperture is dynamically increased as echo signals from deeper depths are returned.

Also, in certain embodiments, the transmit signals can focused at different depths through mechanical or electrical means. In one non-limiting example, the transmit signals are focused electronically.

Also, in certain embodiments, two or more transmissions with different angles can be used to reconstruct velocity vector images. In one non-limiting example, a combination of different transmission angles and reception angles is used to reconstruct velocity vector images. The high frame rate imaging system can further include one or more devices capable of combining one or more bit steam and funneling multi-channel data into higher-speed bit steams with fewer channels. Also, the high frame rate imaging system can further include one or more devices capable of converting electrical bit streams to optical signals. The high frame rate imaging system can further include one or more devices capable of combining multi-channel optical signals into a smaller number of channels. The high frame rate imaging system can further include one or more devices capable of recovering signals received originally by the transducer.

Also in certain embodiments, the high frame rate imaging system can further include a system in which all the components that are needed to reconstruct a multi-dimensional image are integrated into the array transducer probe and the reconstructed images are transmitted wirelessly to an image display device that is not included in the transducer probe. In certain non-limiting embodiments, the optical components that are designed to transfer receive signals to an image reconstruction system are not needed.

It is to be understood that the system described herein can include one or more of the following additional features, either alone, or in combination with other features set forth herein, such as, for example: the spatial frequency can be non-uniform; and phase aberration correction methods can be incorporated into the present system. The system is especially useful so that a physiological functional image is reproduced.

The foregoing has outlined in broad terms the more important features of the invention disclosed herein so that the detailed description that follows may be more clearly understood, and so that the contribution of the instant inventors to the art may be better appreciated. The instant invention is not to be limited in its appreciation to the details of the construction and to the arrangements of the components set forth in the following description or illustrated in the drawings, Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

Further, the above descriptions of the preferred and alternative embodiments of the present invention are intended to be illustrative and are not intended to be limiting upon the scope and content of the following claims.

All of the compositions and methods disclosed and claimed herein is made and executed without undue experimentation in light of the present disclosure. While the compositions and methods of this invention have been described in terms of the foregoing illustrative embodiments, it will be apparent to those skilled in the art that variations, changes, modifications, and alterations may be applied to the compositions and/or methods described herein, without departing from the true concept, spirit, and scope of the invention. More specifically, it will be apparent that subjects other than human body can be imaged with the imaging system also. All such similar substitutes and modifications apparent to those skilled in the art are deemed to be within the spirit, scope, and concept of the invention as defined by the appended claims.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

REFERENCES

The references discussed above and the following references, to the extent that they provide exemplary procedural or other details supplementary to those set forth herein, are specifically incorporated herein by reference.

[1] J. A. Stratton, *Electromagnetic Theory*. New York and London: McGraw-Hill Book Company, 1941, Page 356.

[2] J. Durnin, "Exact solutions for nondiffracting beams. I. The scalar theory," *J. Opt. Soc. Am. A*, vol. 4, no. 4, pp. 651-654, 1987.

[3] J. Durnin, J. J. Miceli, Jr., and J. H. Eberly, "Diffraction-free beams," *Phys. Rev. Lett.*, vol. 58, no. 15, pp. 1499-1501, Apr. 13, 1987.

[4] Jian-yu Lu and J. F. Greenleaf, "Theory and acoustic experiments of nondiffracting X waves," in 1991 *IEEE Ultrasonics Symposium Proceedings*, 91CH3079-1, vol. 2, pp. 1155-1159, 1991 (ISSN: 1051-0117).

[5] Jian-yu Lu and J. F. Greenleaf, "Nondiffracting X waves—exact solutions to free-space scalar wave equation and their finite aperture realizations," *IEEE Transactions on Ultrasonics, Ferroelectrics, and Frequency Control*, vol. 39, no. 1, pp. 19-31, January 1992.

[6] Jian-yu Lu and J. F. Greenleaf, "Experimental verification of nondiffracting X waves," *IEEE Transactions on Ultrasonics, Ferroelectrics, and Frequency Control*, vol. 39, no. 3, pp. 441-446, May 1992.

[7] Jian-yu Lu and Anjun Liu, "An X wave transform," *IEEE Transactions on Ultrasonics, Ferroelectrics, and Frequency Control*, vol. 47, no. 6, pp. 1472-1481, November 2000.

[8] Jian-yu Lu, Hehong Zou and J. F. Greenleaf, "A new approach to obtain limited diffraction beams," *IEEE Transactions on Ultrasonics, Ferroelectrics, and Frequency Control*, vol. 42, no. 5, pp. 850-853, September 1995.

[9] Jian-yu Lu and J. F. Greenleaf, "Pulse-echo imaging using a nondiffracting beam transducer," *Ultrasound in Medicine and Biology*, vol. 17, no. 3, pp. 265-281, May 1991.

[10] Jian-yu Lu and J. F. Greenleaf, "Ultrasonic nondiffracting transducer for medical imaging" *IEEE Transactions on Ultrasonics, Ferroelectrics, and Frequency Control*, vol. 37, no. 5, pp. 438-447, September 1990.

[11] Jian-yu Lu, Tai K. Song, Randall R. Kinnick, and J. F. Greenleaf, "In vitro and in vivo real-time imaging with ultrasonic limited diffraction beams," *IEEE Transactions on Medical Imaging*, vol. 12, no. 4, pp. 819-829, December 1993.

[12] Jian-yu Lu and J. F. Greenleaf, "Evaluation of a nondiffracting transducer for tissue characterization," in 1990 *IEEE Ultrasonics Symposium Proceedings*, 90CH2938-9, vol. 2, pp. 795-798, 1990 (ISSN: 1051-0117).

[13] Jian-yu Lu and J. F. Greenleaf, "Producing deep depth of field and depth-independent resolution in NDE with limited diffraction beams," *Ultrasonic Imaging*, vol. 15, no. 2, pp. 134-149, April 1993.

[14] Jian-yu Lu, "Improving accuracy of transverse velocity measurement with a new limited diffraction beam," in 1996 *IEEE Ultrasonics Symposium Proceedings*, 96CH35993, vol. 2, pp. 1255-1260; 1996 (ISSN: 1051-0117).

[15] Jian-yu Lu, Xiao-Liang Xu, Hehong Zou, and J. F. Greenleaf, "Application of Bessel beam for Doppler velocity estimation," *IEEE Transactions on Ultrasonics, Ferroelectrics, and Frequency Control*, vol. 42, no. 4, pp. 649-662, July 1995.

[16] Jian-yu Lu and Jiqi Cheng, "Field computation for two-dimensional array transducers with limited diffraction array beams," *Ultrasonic Imaging*, vol. 27, no. 0.4, pp. 237-255, October 2005.

[17] Jian-yu Lu and Shiping He, "Optical X wave communications," *Optics Communications*, vol. 161, pp., 187-192, Mar. 15, 1999.

[18] Jian-yu Lu, Jiqi Cheng, and Brent Cameron, "Low sidelobe limited diffraction optical coherence tomography," in

*Coherence Domain Optical Methods in Biomedical Science and Clinical Applications VI*, Valery V. Tuchin, Joseph A. Izatt, James G. Fujimoto, Editors, Proceedings of SPIE, vol. 4619, pp. 300-311, 2002 (ISBN: 0-8194-4358-1).

[19] Claudio Conti and Stefano Trillo, "Nonspreading wave packets in three dimensions formed by an ultracold Bose gas in an optical lattice," *Physical Review Letters*, 92, 120404 (2004).

[20] P. Di Trapani, G. Valiulis, A. Piskarskas, O. Jedrkiewicz, J. Trull, C. Conti, and S. Trillo, "Spontaneously generated X-shaped light bullets," *Physical Review Letters*, 91, 093904 (2003).

[21] Charles Day, "Intense X-shaped pulses of light propagate without spreading in water and other dispersive media," *Physics Today*, v.57, n. 10, pp. 25-26, October 2004.

[22] Jian-yu Lu, Hehong Zou, and J. F. Greenleaf, "Biomedical ultrasound beam forming," *Ultrasound in Medicine and Biology*, vol. 20, no. 5, pp. 403-428, July 1994.

[23] Jian-yu Lu and J. F. Greenleaf, "Diffraction-limited beams and their applications for ultrasonic imaging and tissue characterization," in *New Developments in Ultrasonic Transducers and Transducer Systems*, F. L. Lizzi, Editor, Proceedings of SPIE, vol. 1733, pp. 92-119, 1992 (ISBN: 0-8194-0906-5).

[24] Jian-yu Lu, "2D and 3D high frame rate imaging with limited diffraction beams," *IEEE Transactions on Ultrasonics, Ferroelectrics, and Frequency Control*, vol. 44, no. 4, pp. 839-856, July 1997.

[25] Jian-yu Lu, "Experimental study of high frame rate imaging with limited diffraction beams," *IEEE Transactions on Ultrasonics, Ferroelectrics, and Frequency Control*, Vol. 45, no. 1, pp. 84-97, January 1998.

[26]. Jian-yu Lu, "Transmit-receive dynamic focusing with limited diffraction beams," in 1997 *IEEE Ultrasonics Symposium Proceedings*, 97CH36118, vol. 2, pp. 1543-1546, 1997 (ISSN: 1051-0117).

[27] Glen Wade, "Human uses of ultrasound: ancient and modern," *Ultrasonics*, vol. 38, pp. 1-5 (2000).

[28] Jian-yu Lu et al., "System for extended high frame rate imaging with limited diffraction beams," PCT/US06/033751 filed Aug. 29, 2006, claiming priority from U.S. patent application Ser. No. 60/712,080 filed Aug. 29, 2005.

[29] Jing Wang and Jian-yu Lu, "A study of motion artifacts of Fourier-based image construction," in 2005 *IEEE Ultrasonics Symposium Proceedings*, 05CH37716C, vol. 2, pp. 1439-1442, 2005 (ISSN: 1051-0117).

[30] Jiqi Cheng and Jian-yu Lu, "Fourier based imaging method with steered plane waves and limited-diffraction array beams," in 2005 *IEEE Ultrasonics Symposium Proceedings*, 05CH37716C, vol. 2, pp. 1976-1979, 2005(ISSN: 1051-0117).

[31] Jiqi Cheng and Jian-yu Lu, "Extended high frame rate imaging method with limited diffraction beams," *IEEE Transactions on Ultrasonics, Ferroelectrics, and Frequency Control*, vol. 53, no. 5, pp. 880-899, May, 2006.

[32]3 Jian-yu Lu, Zhaohui Wang, and Sung-Jae Kwon, "Blood flow velocity vector imaging with high frame rate imaging methods," in 2006 *IEEE Ultrasonics Symposium Proceedings*, 06CH37777, vol. 2, pp. 963-966, 2006 (ISSN: 1051-0117).

[33]. Jian-yu Lu, "Limited diffraction array beams," *International Journal of imaging System and Technology*, vol. 8, no. 1, pp. 126-136, January, 1997 (ISSN: 0899-9457).

[34] Jian-yu Lu and Shiping He, "Increasing field of view of high frame rate ultrasonic imaging," *Journal of Acoustical Society of America*, vol. 107, no. 5, pt. 2, pp. 2779, May 2000 (abstract).

[35] Jian-yu Lu, "Nonlinear processing for high frame rate imaging," *Journal of Ultrasound in Medicine*, vol. 18, no. 3 (Supplement), p. S50, March 1999 (abstract).

[36] M. Soumekh, "Array imaging with beam-steered data", *IEEE Trans. Image Processing*, vol. 1, no. 3, pp. 379-390, July 1992.

[37] Hu Peng and Jian-yu Lu, "High frame rate 2D and 3D imaging with a curved or cylindrical array," in 2002 *IEEE Ultrasonics Symposium Proceedings*, 02CH37388, vol. 2, pp. 1725-1728, 2002 (ISSN: 1051-0117).

[38] Bernard D. Steinberg, "Digital beamforming in ultrasound," *IEEE Transactions on Ultrasonics, Ferroelectrics, and Frequency Control*, vol. 39, no. 6, pp. 716-721, November 1992.

[39] Jian-yu Lu and John L. Waugarnan, "Development of a linear power amplifier for high frame rate imaging system," in 2004 *IEEE Ultrasonics Symposium Proceedings*, 04CH37553C, vol. 2, pp., 1413-1416, 2004 (ISSN: 1051-0117).

[40] Jian-yu Lu, "A multimedia example," *IEEE Transactions on, Ultrasonics, Ferroelectrics, and Frequency Control*, vol. 50, no. 9, pp. 1078, September 2003.

[41] M. A. Averkiou, D. R. Roundhill, and J. E. Powers, "A new imaging technique based on the nonlinear properties of tissues," in 1997 *IEEE Ultrasonics Symposium Proceedings*, 97CH36118, vol. 2, pp. 1561-1566, 1997 (ISSN: 1051.0117).

[42] M. O'Donnell, "Coded excitation system for improving the penetration of real-time phased-array imaging systems," *IEEE Transactions on Ultrasonics, Ferroelectrics, and Frequency Control*, vol. 39, no. 3, pp. 341-351, May 1992.

[43] J. G. Abbott, "Rationale and derivation of MI and TI—a review," *Ultrasound in Medicine and Biology*, vol. 25, no. 3, pp. 431-441, 1999.

[44] W. D. O'Brien, Jr, Y. Yang and D. G. Simpson, "Evaluation of unscanned-mode soft-tissue thermal index for rectangular sources and proposed new indices," *Ultrasound in Medicine and Biology*, vol. 30, no. 7, pp. 965-972, 2004.

[45] AIUM/NEMA (American Institute of Ultrasound in Medicine and National Electrical Manufacturers Association). ODS. Standard for the real-time display of thermal and mechanical acoustic output indices on diagnostic ultrasound equipment, Rev I. Laurel, M D and Rosslyn, Va.: AIUM/NEMA, 1998.

[46] C. B. Burckhardt, H. Hoffmann, and P. A. Grandchamp, "Ultrasound Axicon: a device for focusing over a large depth," *J. Acoust. Soc. Amer.*, vol. 54, pp. 1628-1630, December 1973.

[47] F. S. Foster, M. S. Patterson, M. Arditi, and J. W. Hunt, "The conical scanner: a two transducer ultrasound scatter imaging technique," *Ultrason. Imaging*, vol. 3, pp. 62-82, April 1981.

[48] P. M. Morse and H. Feshbach, *Methods of Theoretical Physics*, Part I, New York: McGraw-Hill, 1953, p. 620.

[49] G. S. Kino, *Acoustic Waves: Devices, Imaging and Analog Signal Processing*, Englewood Cliffs, N.J.: Prentice-Hall, 1987.

[50] R. Bracewell, *The Fourier Transform and its Applications*. New York: McGraw-Hill, 1965, Ch. 4 and 6.

[51] A. C. Kak and M. Slaney, *Principle of Computerized Tomographic Imaging*. New York, N.Y.: IEEE press, 1987, Ch. 6.
[52] M. Born and E. Wolf, *Principles of Optics*. Cambridge: Cambridge University Press, 7$^{th}$ ed. Ch. 13, 1999.
[53] G. C. Sherman, "Application of the convolution theorem to Rayleigh's integral formulas," *J. Opt. Soc. Am.*, vol. 57, pp. 546-547, April 1967.
[54] J. W. Goodman, *Introduction to Fourier Optics*. New York, N.Y.: McGraw-Hill, 1968, Ch. 2-4.
[55] James W. Cooley and John W. Tukey; "An algorithm for the machine calculation of complex Fourier series," *Math. Comput.*, vol. 19, pp. 297-301, 1965.
[56] R. M. Lemor, P. K. Weber, P. K. Fonfara, C. Guenther, H. J. Welsch, M. L Hoss, L. Masotti, E. Biagi, M. Scabia, A. Acquafresca, R. Facchini, S. Manh, and A, Ricci; "A new combined open research platform for ultrasound radio frequency signal," in 2003 *IEEE Ultrasonics Symposium Proceedings*, 03CH37476, vol., pp. 33-37, 2003.
[57] K. Weber, H. Fonfara, H. J. Welsch, D. Schmitt and C. Gunther, "A phased array system for the acquisition of ultrasonic RF-data up to 20 MHz," *Acoustical imaging*, vol. 27, March 24th-27th, Sarbrucken, Germany (2003).
[58] J. A. Jensen, O. Holm, L. J. Jensen, H. Bendsen, S. I. Nikolov, B. G. Tomov, P. Munk, M. Hansen, K. Salomonsen, J. Hansen, K. Gormsen, H. M. Pedersen, and K. L. Gammelmark, "Ultrasound Research Scanner for Real-Time Synthetic Aperture Data Acquisition," *IEEE Transactions on Ultrasonics, Ferroelectrics, and Frequency Control*, vol. 52, no. 5, pp. 881-891, May 2005.
[59] M. Fink, L. Sandrin, M. Tanter, S. Catheline, S. Chaffai, J. Bercoff, and J.-L. Gennission, "Ultra High Speed Imaging of Elasticity," in 2002 *IEEE Ultrasonics Symposium Proceedings*, 02CH37388, vol. 2, pp. 1811-1820, 2002.
[60] J. C. Lacefield and R. C. Waag, "Time-Shift Estimation and Focusing through Distributed Aberration Using Multirow Arrays," *IEEE Transactions on Ultrasonics, Ferroelectrics, and Frequency Control*, vol. 48, no. 6, pp. 1606-1624, November 2001.

What is claimed is:

1. A method for producing an image, comprising:
a) transmitting at least one group of signals of energy toward one or more objects to be imaged with a one- or two-dimensional array transducer, where, in each transmission, transmitters of different gains are selected for the elements of the array transducer according to a square-wave weighting function that is applied along each of the dimensions of the transducer, the square-wave weighting function having different frequencies or phases for transmissions in each group, wherein the square-wave weighting function is determined by:

$$w_s(x) = \begin{cases} 1, & \sin(x) \geq 0 \\ -1, & \sin(x) < 0, \end{cases} \text{ and } w_c(x) = \begin{cases} 1, & \cos(x) \geq 0 \\ -1, & \cos(x) < 0, \end{cases}$$

where $w_s$ and $w_c$ are the sine and cosine square-wave aperture weighting functions wherein x is dependent on the projection of the transmission wave vector along an axis of the array transducer and the position at the surface of the transducer;
b) combining receive signals from the transmissions in each group to produce a complex receive signal set; Fourier transforming the complex receive signal set in time domain, and weighting or Fourier transforming the complex receive signal set spatially on one or more dimensions of the transducer to form a spectrum data set;
c) mapping the spectrum data set of step b) to produce a two- or three-dimensional image data set in Fourier domain; and performing a two- or three-dimensional inverse Fourier transform to obtain image data set in spatial domain; and,
d) masking, and then superposing the image data sets of step c) from different groups to reconstruct an image.

2. The method as in claim 1, wherein the image comprises a velocity vector image, further including:
transmitting each group of signals two or more times; and using the image data sets to reconstruct:
i) a first set of velocity component images in a first direction, and
ii) a second set of velocity component images in a second direction that is different from the first direction; and,
reconstructing one or more velocity vector images from the first and second sets of the velocity component images.

3. The method as in claim 1, wherein the complex receive signal set is weighted spatially on one or more dimensions of the receiving aperture by the sine and cosine square-wave weighting functions of different frequencies; and by the sine and cosine square-wave weighting functions on the complex received signal set can be performed with analog summers and subtractors, in which the summers and subtractors can be of multiple stages to reduce the number of inputs of each of the summer and each of the subtractor.

4. The method as in claim 1, in which exact sine and cosine aperture weightings or the sin and cosine square wave aperture weightings on the complex receive signal set can be used as a spatial analyzer for waves received by the receiver.

5. The method as in claim 4, in which the spatial analyzer is configured to measure phase and amplitude of spatial frequency components of the waves received, or, is configured to measure real and imaginary parts of spatial frequency components of the waves received.

6. The method as in claim 1, including, in step a, supplying an output voltage of fixed amplitude (or gain) using a first transmitter, and supplying an inverted output of the fixed amplitude (or gain) using a second transmitter.

7. The method as in claim 1, including using, in step a), two transmitters where, in each transmission, one of the two transmitters is selected for an element of an array transducer though an electric switch according to the sign of the square-wave weighting functions at the location of the element; or, in which more than two transmitters are used to produce weightings for the element.

8. The method as in claim 1, in which a single transmitter is used to produce weightings for different transducer elements, where the transducer elements can be switched between the output voltage of the single transmitter and no output.

9. The method as in claim 1, in which the transmitted signal is a broadband or narrowband signal.

10. The method as in claim 1, in which the transmitted signal is a coded signal comprising a chirp, Golay code, or m-sequence.

11. The method as in claim 1, in which receive beams are steered or rotated through a linear phase shift in one or more dimensions of frequency domain of received signals before weightings or spatial Fourier transformation to increase image reconstruction quality, reduce digital noises, and to reduce computations.

12. The method as in claim 1, further including applying area or volume masks to partially reconstructed images to remove unwanted digital noise in the image reconstruction step d).

13. The method as in claim 1, in which the signals are transmitted with a one-dimensional or two-dimensional array transducer.

14. The method as in claim 1, further including weighting the complex receive signal set with exact limited-diffraction beams or the sine and cosine square-wave aperture weightings of different parameters either before or after analog-to-digital conversion of the receive signals.

15. The method as in claim 2, in which the images are flow velocity vector images being reconstructed with one or more of: a Doppler method, a color flow autocorrelation method, a cross-correlation method, a B-flow method, a motion detection method that is unique to the sine and cosine square-wave aperture weightings, and a combined Doppler and cross-correlation method.

16. The method as in claim 2, in which the images are flow velocity vector images, the images being reconstructed from different receive angles but with the same transmissions.

17. The method as in claim 2, in which the first direction can be perpendicular with respect to a surface transmitting the signals.

18. The method as in claim 1, in which image data sets in step c) in a single direction can be used to reconstruct the first and second velocity component images through rotating an axis of the image data sets and then recomposing the image data sets along the direction of rotated axis through interpolation.

19. The method as in claim 2, including transmitting two or more transmissions with different angles to reconstruct the first and second sets of velocity component images.

20. The method as in claim 2, in which a combination of different transmission angles and reception angles is used to reconstruct the first and second sets of velocity component images.

21. The method as in claim 2, in which elasticity images or strain rate images are reconstructed with the velocity component or vector images.

22. The method as in claim 2, in which a physiological functional image is produced with the velocity component or vector images.

23. The method as in claim 1, wherein the spatial frequency is non-uniform.

24. The method as in claim 1, further including converting at least the receive signals to optical signals, transferring the optical signals through optical fibers, and recovering electrical signals from the optical signals for image reconstruction.

25. The method as in claim 1, in which all electronic components that are needed to reconstruct a multi-dimensional image are integrated into the array transducer probe and the reconstructed images are transmitted wirelessly to an image display device that is not included in the transducer probe.

* * * * *

UNITED STATES PATENT AND TRADEMARK OFFICE
CERTIFICATE OF CORRECTION

PATENT NO. : 8,496,585 B2  
APPLICATION NO. : 12/162001  
DATED : July 30, 2013  
INVENTOR(S) : Jian-Yu Lu Page 1 of 1

It is certified that error appears in the above-identified patent and that said Letters Patent is hereby corrected as shown below:

In the Claims

Column 35, Line 51, Claim 1, after group insert -- ; --.

Column 36, Line 26, Claim 3, after and delete "by".

Column 36, Line 41, Claim 6, after step a insert -- ), --.

Signed and Sealed this  
Twenty-fourth Day of September, 2013

Teresa Stanek Rea  
*Deputy Director of the United States Patent and Trademark Office*